(12) United States Patent
Ozaki et al.

(10) Patent No.: US 7,146,871 B2
(45) Date of Patent: Dec. 12, 2006

(54) VEHICLE RUNNING RANGE SWITCHING DEVICE

(75) Inventors: Kazuhisa Ozaki, Anjo (JP); Takeshi Inuzuka, Anjo (JP); Chihiro Hosono, Anjo (JP); Kazuhisa Murase, Anjo (JP); Michimasa Tanaka, Anjo (JP)

(73) Assignee: Aisin A W Co., Ltd, Anjo (JP)

( * ) Notice: Subject to any disclaimer, the term of this patent is extended or adjusted under 35 U.S.C. 154(b) by 84 days.

(21) Appl. No.: 10/825,595

(22) Filed: Apr. 16, 2004

(65) Prior Publication Data

US 2004/0261559 A1 Dec. 30, 2004

(30) Foreign Application Priority Data

Apr. 18, 2003 (JP) ............................. 2003-114970
Dec. 25, 2003 (JP) ............................. 2003-431612
Mar. 4, 2004 (JP) ............................. 2004-061443

(51) Int. Cl.
*F16H 59/00* (2006.01)
*B60K 17/04* (2006.01)
*B60K 20/00* (2006.01)

(52) U.S. Cl. ................... 74/335; 74/473.12; 74/473.25
(58) Field of Classification Search ................ 74/335, 74/89.32, 89.34, 473.12, 473.25
See application file for complete search history.

(56) References Cited

U.S. PATENT DOCUMENTS

| | | | |
|---|---|---|---|
| 4,843,901 A | 7/1989 | Peterson et al. ............... 74/335 |
| 5,090,540 A * | 2/1992 | Hasegawa et al. ............. 74/335 |
| RE34,064 E * | 9/1992 | Tury et al. ..................... 74/335 |
| 6,016,717 A * | 1/2000 | Wheeler .................. 74/473.12 |
| 6,487,484 B1 * | 11/2002 | Shober et al. ................. 74/335 |
| 6,612,202 B1 * | 9/2003 | Thorum et al. ........... 74/606 R |
| 6,752,036 B1 * | 6/2004 | Kropp et al. ............ 74/473.12 |

FOREIGN PATENT DOCUMENTS

| | | |
|---|---|---|
| EP | 1113195 A1 * | 7/2001 |
| JP | 7-310820 | 11/1995 |
| JP | 2002-310295 | 10/2002 |

\* cited by examiner

*Primary Examiner*—Roger Pang
(74) *Attorney, Agent, or Firm*—Bacon & Thomas

(57) ABSTRACT

A range switching device is provided that is capable of selecting a running range accurately using a simple configuration and control. The range switching device includes a conversion mechanism which, in turn, includes a ball screw shaft, a ball nut, and other members. The ball nut is connected to a spool through an arm member, a range control shaft, and a detent lever. The spool is moved into a specified selection region among a plurality of selection regions by the conversion mechanism and the arm member. Then, the spool is more precisely moved to a selection position within the specified selection region by the detent mechanism and positioned and held threat.

9 Claims, 22 Drawing Sheets

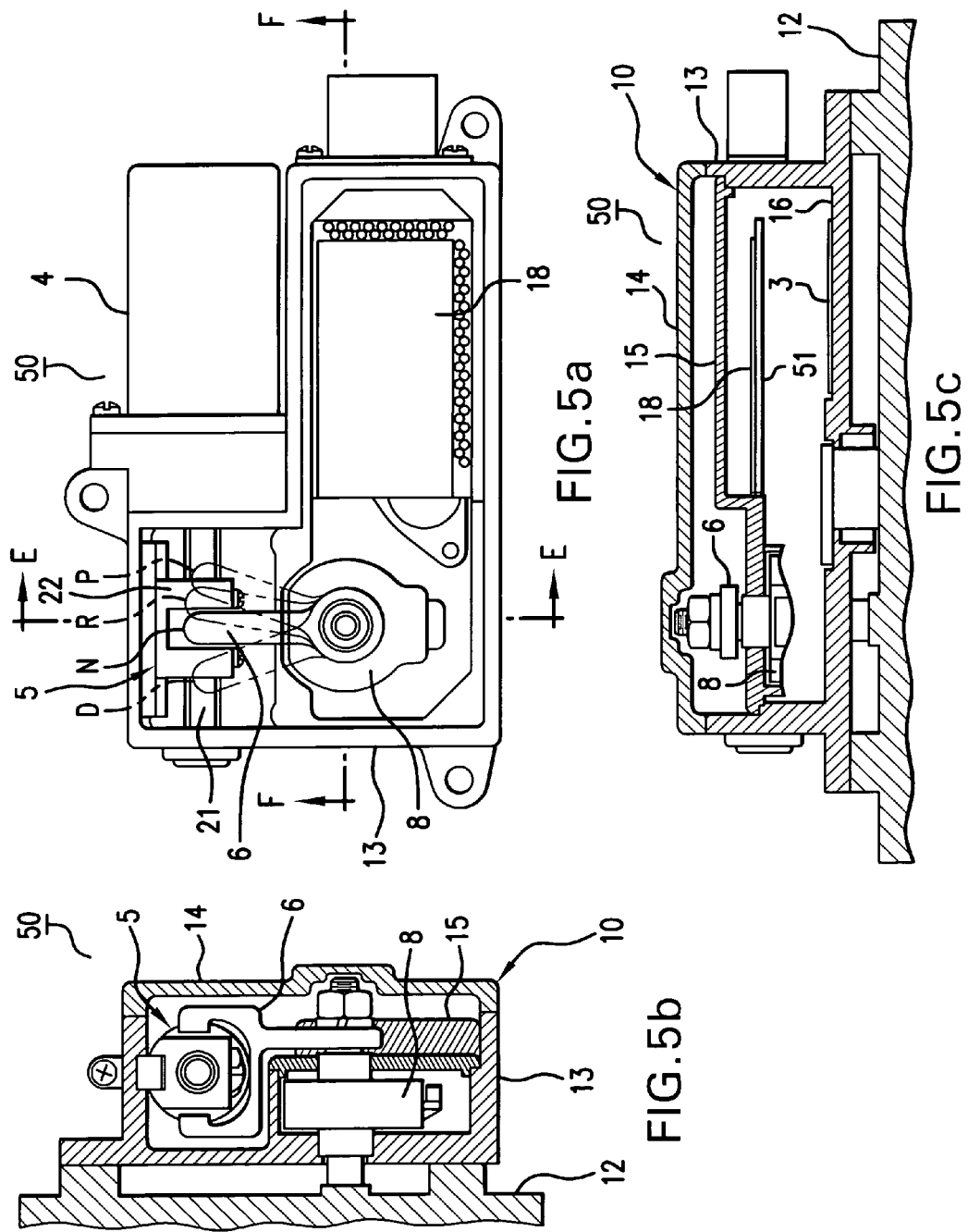

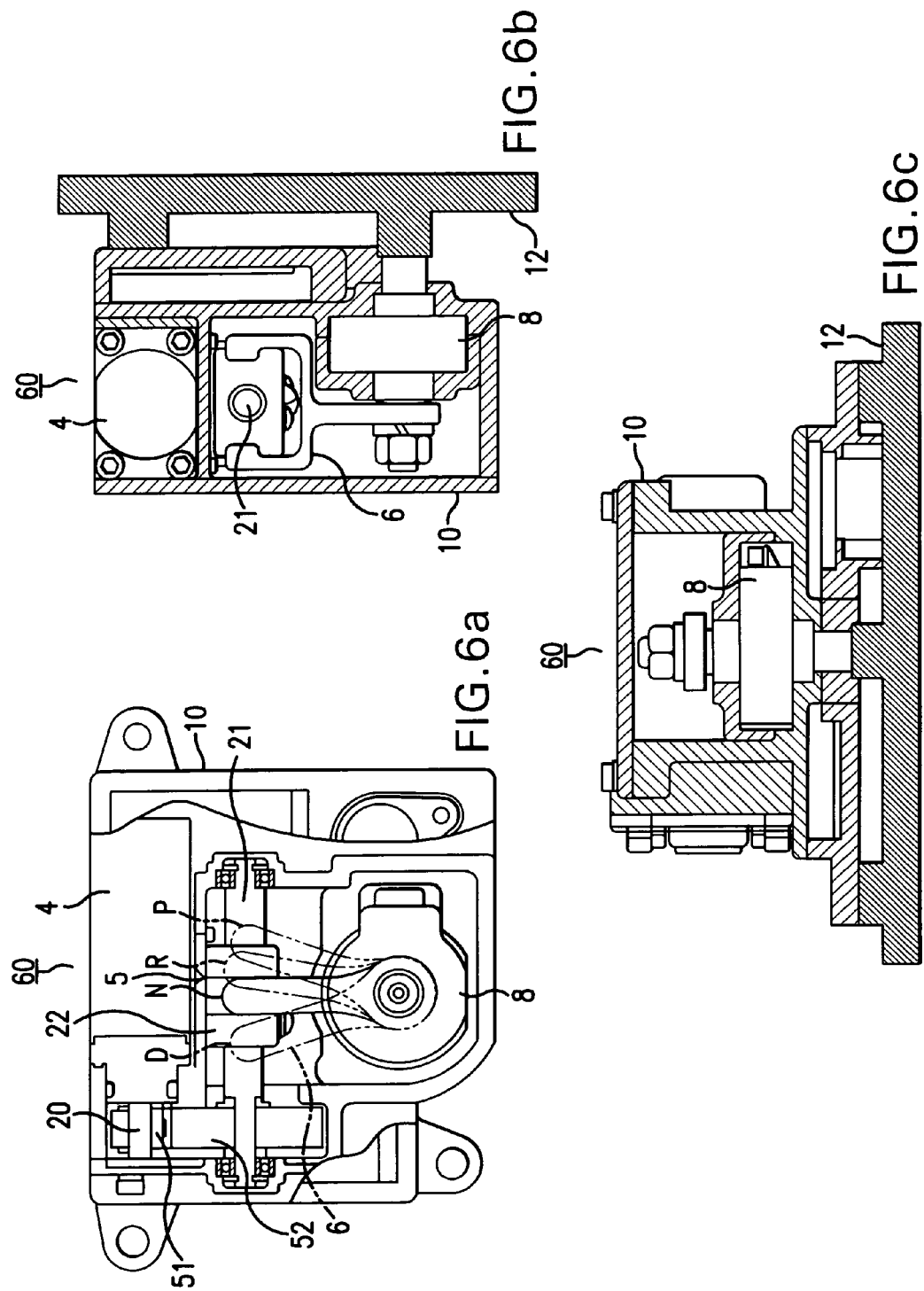

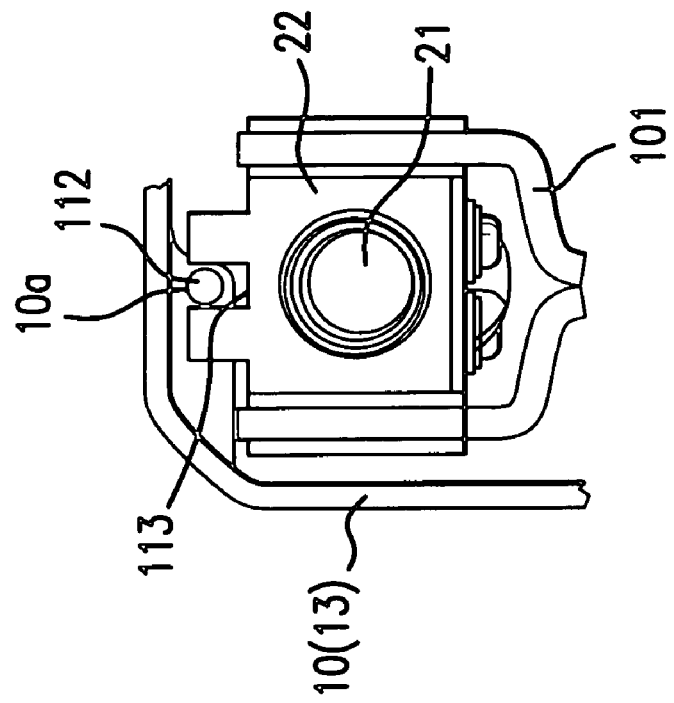
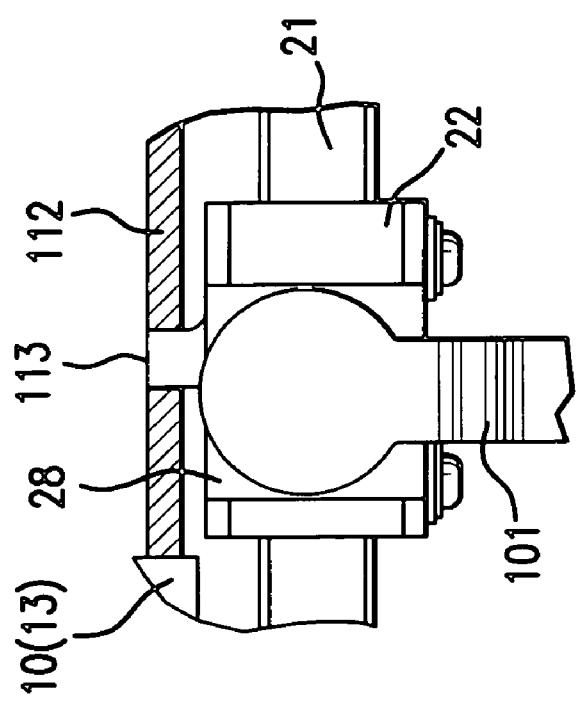
FIG. 16a
FIG. 16b

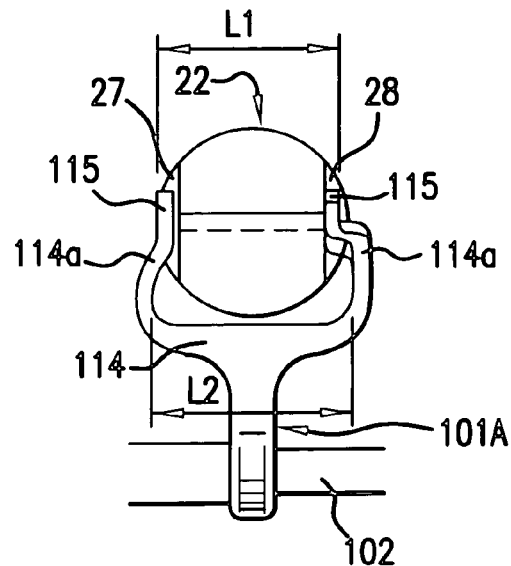
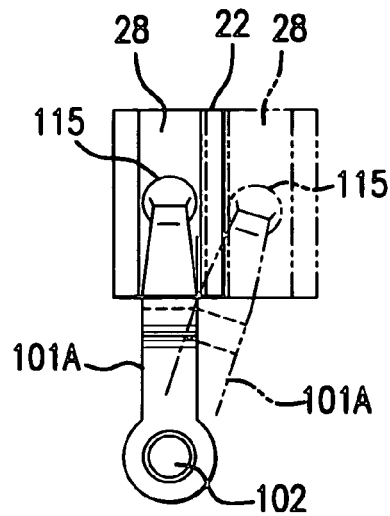
FIG.17a  FIG.17b
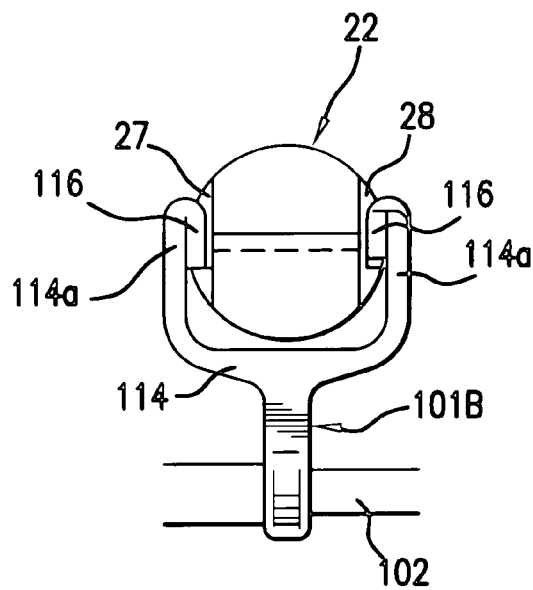
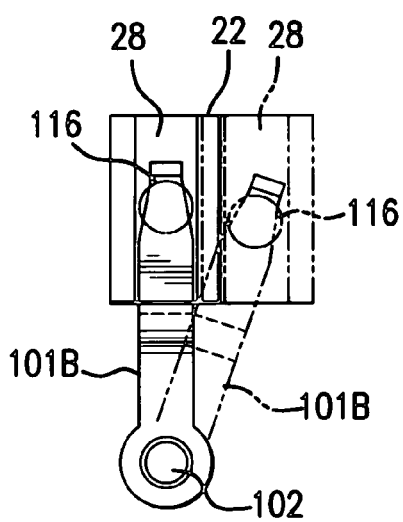
FIG.18a  FIG.18b

VEHICLE RUNNING RANGE SWITCHING DEVICE

The disclosure of Japanese Application No. 2004-061443 filed Mar. 4, 2004, Japanese Application No. 2003-431612 filed Dec. 25, 2003 and Japanese Application No. 2003-114970 filed Apr. 18, 2003 including the specifications, drawings and abstracts are incorporated herein by reference in their entirety.

CROSS-REFERENCE TO RELATED APPLICATIONS

The priority of Japanese Application No. 2004-061443 filed Mar. 4, 2004, Japanese Application No. 2003-431612 filed Dec. 25, 2003 and Japanese Application No. 2003-114970 filed Apr. 18, 2003 is hereby claimed under 35 USC 119.

BACKGROUND OF THE INVENTION

1. Field of the Invention

The present invention relates to a vehicle running range switching device of the so-called shift-by-wire type in which a vehicle driver selects the running range (for example, P, R, N, or D) using a shift lever, for example, to output an electric signal.

2. Description of the Related Art

Generally, the running range of a vehicle provided with an automatic transmission is selected by operation of a shift lever so as to shift a manual valve, thereby changing a hydraulic path in a hydraulic controller. One conventional system for execution of the selected shift is a shift-by-wire (SBW) system in which the selected running range is set by electric signals (see, for example, Japanese Patent Laid-Open Hei 7-310820), instead of mechanically actuated by a wire or rod.

Other examples include Japanese Patent Application Laid-Open No.2002-310295which discloses a shift-by-wire (SBW) system that uses a feed screw device, and U.S. Pat. No. 4,843,901 which discloses a shift-by-wire (SBW) system using a worm gear. It is well known that the feed screw device disclosed in Japanese Patent Application Laid-Open No.2002-310295 is capable of achieving a large reduction ratio and high positional accuracy. On the other hand, the worm gear disclosed in U.S. Pat. No. 4,843,901 can also provide a large reduction ratio.

However, the system of Japanese Patent Application Laid-Open No.2002-310295 is configured such that rotation of a motor 2 directly drives, i.e., advances/retracts, a valve rod 11 of a control valve 1 using a feed screw unit 4, which serves as a conversion mechanism. That is, a screw member 42 and the valve rod 11 are disposed coaxially in series, and the screw member 42 is axially moved so as to advance or retract the control rod 11. For this reason, the unit is as long as the sum of the lengths of the screw member 42 and the valve rod 11, plus a length allowing for axial advancement/retraction of the screw member 42 (axial advancement/retraction of the valve rod 11). Consequently, the unit must be substantially enlarged, which has a detrimental effect on freedom of design since positioning of installation is restricted.

As described in Japanese Patent Application Laid-Open No.2002-310295, the rotation of the screw member 42 is stopped by a rod 51 that is connected to a parking unit 5. As a result, the rod 51 must be highly durable. Further, the configuration is such that vibration generated by rotation of a nut member 41 is transmitted directly to the parking unit 5 and the valve rod 11 of the control valve 1 through the screw member 42. Accordingly, durability of the control valve 1 is reduced. Further, because the rod 51 and the valve rod 11 of the control valve 1 are required to transmit different pressures and are driven by the same screw member 42, the screw member 42 may become distorted. In this case, balls within the nut member 41 make irregular localized contact, as a result of which it impossible to drive the nut member 41 smoothly, and efficiency is reduced.

On the other hand, with the mechanism disclosed in U.S. Pat. No. 4,843,901, the worm gear is usually subject to substantial contact resistance with an intermeshed gear, and thus needs to receive a larger force from a motor than that provided by a ball screw in order to be rotated. In addition, if driven in reverse, an even larger force is required, i.e., a substantial torque output from the motor. Therefore, if, for example, the running range cannot be changed because a failure occurs in the motor or the worm gear, with the mechanism disclosed in U.S. Pat. No. 4,843,901, manual release is enabled so as to allow forcible change of the running range and that manual release requires only a small force. Accordingly, the worm gear is mechanically separated from the other gears. However, in this case, manual release cannot be achieved easily because it can be executed only after a complicated procedure for separating the gears mechanically. Further, a mechanism for mechanical separation is required, thus enlarging the range switching device and, consequently, production costs thereof are increased. Moreover, because gears are used for torque transmission, manual release cannot be easily executed, and therefore, the position of installation and method for manual release are restricted. Additionally, after the worm gear and the intermeshed gear are separated, they need to be meshed with each other once again afterwards. As a result, the gears can be damaged, which leads to a reduction in the durability of the device. In particular, when only the worm gear needs to be separated, meshing of the worm gear with another gear needs to be adjusted.

SUMMARY OF THE INVENTION

Accordingly, a first object of the present invention is to provide a range switching device that offers improved freedom of design by eliminating factors enlarging the device.

A second object of the present invention is to provide a range switching device that is provided with a rotation stopping unit that facilitates smooth operation of a conversion mechanism and thus improves efficiency.

A third object of the present invention is to provide a range switching device that is capable of executing manual release in a simple manner.

According to a first aspect of the invention, linear motion of the conversion mechanism is converted to swinging (pivoting) motion of the intermediate member, and the range switching member is disposed within a selection region corresponding to, for example, P, N, R or D as a result of this swinging motion of the intermediate member. Consequently, the length of advancement/retraction of the range switching member can be adjusted appropriately by the intermediate member (by changing the shape, size, arrangement and/or direction thereof). Thus, it is not necessary to pay special attention to the length of advancement/retraction of the range switching member when respective structural members of the range switching device are assembled, whereby freedom of design is increased and limitations on arrangement of positions of the respective structural members are reduced.

Further, the number of gear steps in the conventional mechanism can be reduced as compared with a conventional conversion mechanism with a gear train having a plurality of gears. Consequently, control is improved and structural members for complicated control and improvement thereof do not need to be added. As a result, production cost can be reduced.

According to a second aspect of the invention, the range switching member is positioned in a selection region through the intermediate member. Consequently, the range switching member can be positioned within the selection region using a simple control.

According to a third aspect of the invention, because motion of the conversion mechanism is converted to swinging motion by the arm member, the magnitude of the transmitted torque and the extent of movement (advancement/retraction) of the range switching member can be easily adjusted by setting the length of the arm of the arm member appropriately. Because the number of gears in the gear train does not need to be increased, the torque transmission rate is not reduced, and transmission noise is extremely low. Further by changing the length, shape and direction of connection of the arm member, the extent of advancement/retraction and the direction of movement of the range switching member can be freely adjusted. Thus, if any member that requires change in the extent of advancement/retraction, such as a lock mechanism, is added to the arm, in addition to the range switching member, the extent of advancement/retraction and the direction of movement can be set appropriately for each such member. Accordingly, general purpose applicability is improved.

According to a fourth aspect of the invention, control of the conversion mechanism is improved as compared to that of a conversion mechanism constituted of a plurality of gears. Thus, the range switching member can be easily placed in a selection region corresponding to a range newly selected by the driver. Further, the range switching member is accurately moved within the selection region to a selection position by utilization of a detent mechanism, whereby overall control is simplified.

The provision of the detent mechanism which holds the range switching member within the selection region enables reaction force from the range switching member (for example, a manual valve) to be countered so as to hold the position of the range switching member. Thus, there is no need for addition of an additional position holding mechanism, and a conventional detent mechanism may be used as is, thereby leading to reduction in cost.

According to a fifth aspect of the invention, the extent of advancement/retraction can be changed by changing the distances between and a shape of a plurality of convex and concave portions that are provided for positioning of the detent member. Thus, the extent of advancement/retraction of the range switching member can be adjusted as desired, and even if the extent of advancement/retraction of the lock mechanism in the detent member is different from the extent of advancement/retraction of the range switching member, the extent of advancement/retraction amount can be set for each of the lock mechanism and the range switching member.

According to a sixth aspect of the invention, the extent of advancement/retraction and the direction of movement of the range switching member can be appropriately set using the connection position and connection direction between the range switching member and detent member.

In another aspect of the invention, the direction of the linear motion to be converted by the conversion mechanism is different from the direction of movement of the range switching member, thereby improving the degree of design freedom.

According to yet another aspect of the invention, the range switching member is moved by the motor to one of a plurality of selectable regions through the conversion mechanism and the arm member, and after that, this range switching member is more precisely positioned by the detent mechanism and held there. That is, the motor provides macro-control of the range switching member by which the range switching member is placed in the predetermined selection region and after that, movement of the range switching member within the predetermined selection region to the selection position, which requires higher positional accuracy, is effected by the detent mechanism. Therefore, high positional accuracy can be maintained while the overall control is simplified.

According to another aspect of the invention, the position of the range switching member can be detected without relying on the position of the conversion mechanism and the operational state of the intermediate member (regardless of the lock position of the ball screw). As a result, accuracy of position detection is improved.

Further, since one of the first and second control units can be incorporated in the case, the control unit does not need to be external to the case. Consequently, the size of the mechanism can be reduced without an increase in cost.

Further, because at least one of the first and second control units is housed in the case provided with the motor, the control unit can be disposed in the vicinity of the motor, thereby minimizing the length of wire required for connection thereof. Consequently, the space necessary for the wiring is reduced and the influence of electromagnetic noise generated by a long wire can be reduced.

Optionally, the first and second control units are disposed on upper and lower levels, whereby the area thereby occupied can be reduced, as compared to a side by side arrangement, by the extent of their overlap. Further, the first control unit can be added to a conventional second control unit without need for substantial changes in design or arrangement.

If the first and second control units are disposed on the same support member, the assembly of the first and second control units is easy as compared to assembly of a structure wherein they are disposed on upper and lower levels. Particularly, if the first and second control units are mounted on different areas of the same support, the task of assembly is much easier.

Because the position of the range switching member is detected through the intermediate member, the position of the range switching member need not be detected directly, thereby increasing the degree of freedom of design.

Preferably, the conversion mechanism includes a ball screw, whereby the range switching member can be moved with high positional accuracy. Further, because the coefficient of friction is extremely small as compared to that of a sliding contact screw, the ball screw is particularly effective when the range switching member is moved to a selected region by the detent mechanism. That is, if the ball screw shaft needs to be rotated by moving the ball nut in the axial direction, it can be rotated with relative ease, and the torque required for rotating the ball screw shaft is small. In other words, the range switching member can be switched with a small force. Thus, the size of the motor, which is the driving source, can be reduced. Therefore, the size of the mechanism as a whole can be reduced, thereby reducing power consumption.

Additionally, the movement of the ball nut in the axial direction can be controlled in accordance with the direction of rotation of the motor, thereby improving control accuracy. Thus, it is not necessary to add any additional member simply for the purpose of reversing the axial movement, such as an electromagnetic clutch, whereby cost can be reduced.

Further, the setting of the reduction ratio is easier as compared to a conversion mechanism constituted of a gear train having a plurality of gears and a high reduction ratio can be attained.

In another aspect of the invention, a conversion mechanism having an extremely low friction coefficient includes an axial cam member having a spiral cam groove and roller-shaped cam followers which roll along the cam groove.

Optionally, an auxiliary switching unit may be provided for actuating the range switching member manually even if the motor is inactive.

Because the auxiliary switching unit switches the range switching member by moving the arm member, the range switching member can be positioned as chosen, regardless of the position of the nut member. Further, because the auxiliary switching unit changes the range switching member by moving the nut of the conversion mechanism, the range switching member can be changed with a smaller force than when the arm member is moved.

The nut member of the conversion mechanism may be stopped from rotating when the engagement member held by the case member engages the guide groove. Accordingly, the nut member is permitted to move with a degree of play in line with the ball screw shaft.

Further, the engagement member may be a pin-like member that protrudes into the case and that has a simple configuration.

If the engagement member is a rail-like member inserted into the case, an oil seal, which is necessary for a configuration in which the engagement member goes through the case, is not needed.

In embodiments wherein the arm member is formed by combining two parts of the same shape, cost can be reduced since mass production of the part is thereby facilitated. Further, because of excellent freedom of design, the shape of the arm member can be formed appropriately in line with the arrangement of other structural members. Because the arm member has a small bifurcated section, the space occupied thereby is reduced.

The range switching member can be configured as a unit with the case, and following integration, can be installed on the casing. Therefore, the unit is easily incorporated into any vehicle, including those not provided with the range switching device of the present invention.

According to the present invention, it is possible to clearly separate the section (the electronic chamber) housing the first and the second control units, and the section (the mechanical chamber) housing the conversion mechanism, the arm member and the auxiliary switching unit.

A compact configuration can be attained without interference between the ball nut and the motor and despite the provision of the auxiliary switching unit.

In a preferred embodiment, the axial member of the auxiliary switching unit that is disposed in parallel to the ball screw shaft is slid axially during manual operation. Accordingly, the overall dimensions, including that in the direction of sliding, and in particular, that in the direction perpendicular to the axial direction, can be reduced, thereby achieving a compact configuration.

The bearing supporting rotation of the motor and the bearing supporting the end section of the ball screw shaft may be located at different axial positions. Accordingly, overlap therebetween is prevented, whereby reduction of the dimension perpendicular to the axis is possible.

Because the rotation of the nut member is stopped by the rotation stopping unit, the screw member does not become loose, thus allowing the nut member to rotate smoothly and to move in the axial direction. Further, a connecting member for connecting the parking rod, which acts as a screw member rotation stopper, is not needed, in contrast to the related art. Accordingly, cost can be reduced. Further, because the certain axial length of the connecting member, for connecting the rotation stopping member, is not required, its axial dimension can be made smaller.

Where the rotation stopping unit is supported on the case, vibration generated by operation of the motor is absorbed by the rotation block, thus enabling accuracy of positioning of the range switching member to be improved. Further, there is no impact on the parking mechanism, in contrast to the related art.

The mechanism of the invention may be constructed as a single, integral unit including the conversion mechanism, thereby improving general purpose availability. Further, the parking mechanism is not adversely affected as in the related art.

In embodiments wherein rotation is stopped by engaging the engagement member held by the case with the guide groove in the nut member, the screw member is effectively prevented from becoming deformed or distorted. Consequently, the nut member can slide smoothly along the screw member. In this respect, the engagement member is preferably configured as a pin-like member that engages the guide groove with a degree of play. More preferably, the engagement member is a pin-like screw member that engages the guide groove with a degree of play. Alternatively, the engagement member may be a rail-like member that engages the guide groove with a degree of play.

In another preferred embodiment the ball nut is sandwiched between ends of the bifurcated arm, and the ball nut makes contact with the arm member at two points. Consequently, torque is transmitted to the arm member equally through the two points so that the balls roll smoothly and the ball nut can move in parallel to the shaft. As a result, efficiency of the ball screw is increased and the durability of the ball screw is improved.

Preferably, the axial clearance between the ball nut and the arm member can be adjusted, whereby the balls can be made to roll smoothly and the ball nut can move in parallel to the shaft. Consequently, the efficiency and durability of the ball screw are improved.

Where the arm member swings relative to the cam follower that engages the groove in the ball nut, as the ball nut moves linearly along the ball screw axis, that swinging motion proceeds smoothly. Preferably, the cam follower is formed in a circular shape, contributing to smoothness of the swinging motion of the arm member. Further, where the circular cam followers are connected to ends of the bifurcated arm which narrows gradually toward its distal ends, the distal ends of the bifurcated arm are unlikely to interfere with the ball nut during swinging of the arm. Further, such an arm member is easily produced. Further, where the circular cam followers overlap with the inside of the distal ends of the bifurcated arm, the distal ends of the bifurcated arm are unlikely to interfere with the ball nut as the arm swings. Further, if the cam follower is in the form of roller-like members rotatably supported by the respective distal ends of the bifurcated arm, the swinging motion of the arm member is even smoother.

According to yet another aspect of the invention, in embodiments where the range can be switched by manual operation of the auxiliary switching unit, even if the range switching device is inactive, the vehicle can be moved by manual operation. Further, because mechanical separation of gears is not necessary, a mechanism for gear separation is not needed, and thus the auxiliary switching unit have a simple configuration and the size of the device can be reduced. Because wear resulting from disengagement and re-engagement can be reduced, the durability of the device is improved.

Further, because the conversion mechanism converts rotary motion to linear motion, manual release can be achieved with linear motion without rotating the gears, unlike the related art conversion mechanism using a gear train. Thus, the conversion mechanism can have a simplified form, thereby allowing reduction in the size of the device. Further, because the manual release need not be positioned on a specific transmission member, the degree of freedom of design is improved. Thus, the range switching member can be switched using a simple mechanism without providing any special elements.

The release load and the release stroke can be set appropriately depending on the length of the arm of the arm member because the conversion mechanism is the driven object.

In embodiments wherein the driven object is the intermediate member, the auxiliary switching unit may be freely positioned regardless of the position of the ball nut. Further, because the range is selected by driving the intermediate member, the range switching member can be switched more securely. Further, because a mechanism for engaging and disengaging gears is not needed, the size of the device can be reduced.

The auxiliary switching unit may be detachably connected to the linearly moving member, and the range switching member can be switched by moving the linearly moving member along the shaft using the auxiliary switching unit. Manual release can be achieved using a simple design and operation, that is, by engaging a protrusion of the ball nut with a hook on the axial member.

BRIEF DESCRIPTION OF THE DRAWINGS

FIG. 5(a) is a plan view of a case member according to a second embodiment with an upper cover and an intermediate cover thereof removed, and FIGS. 5(b), 5(c) are sectional views of the case member 10 taken along lines E—E and F—F, respectively, of FIG. 5(a);

FIGS. 6a, 6b and 6c illustrate a third embodiment;

FIGS. 16(a) and 16(b) illustrate another ball nut rotation stopper applicable to the sixth embodiment;

FIGS. 17(a) and 17(b) illustrate the configuration of another arm member;

FIGS. 18(a) and 18(b) illustrate yet another arm member;

DESCRIPTION OF THE PREFERRED EMBODIMENTS

Figure 1:
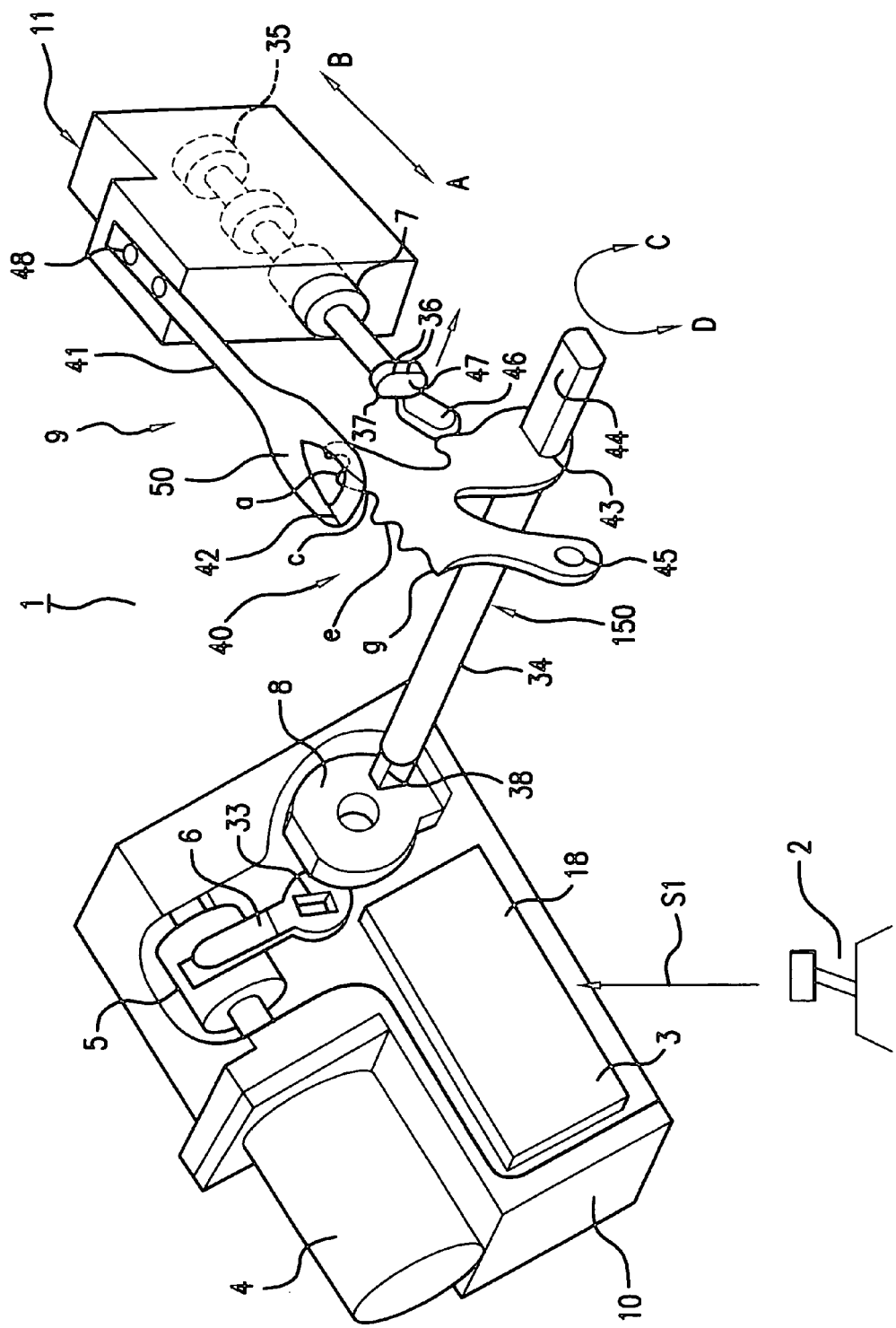
FIG. 1 is a perspective view of the overall configuration of a range switching device according to a first embodiment of the present invention.

Hereinafter, preferred embodiments of the present invention will be described with reference to the accompanying drawings. In the figures, structural members with the same configuration and operation are denoted by the same reference numerals, and a description thereof is not repeated.

First Embodiment

FIG. 1 shows a range switching device 1 for a vehicle (hereinafter referred to simply as "range switching device") according to a first embodiment of the present invention. The range switching device 1 is incorporated into an automatic transmission (for example, a multi-step automatic transmission or a continuously variable transmission (CVT)) that is mounted in a vehicle. As shown in FIG. 1, the main structural components of the range switching device 1 include a shift lever 2 which is a range selection unit allowing a vehicle driver to select a running range; a first control unit 3 for generating an electric control signal based on an electric shift signal S1 from the shift lever 2; a motor 4 which is controlled based on the control signal from the first control unit 3; a conversion mechanism 5 for converting rotary motion of the motor 4 to linear motion; an arm 6 for converting the linear motion from the conversion mechanism 5 to a swinging motion; a spool 7 which is a range switching member moved by an arm 46; a position sensor 8 which is a position detecting unit for detecting the position of the spool 7 through the arm 6; and a detent mechanism 9 which positions and holds the spool 7. Of these main structural members, the first control unit 3, the conversion mechanism 5, the arm member 6, and the position sensor 8 are accommodated in the same case 10 and the motor 4 is mounted on this case 10. The spool 7 is disposed within a valve body 11 of the automatic transmission. According to this embodiment, an intermediate member 150, which acts as a power transmission member, is disposed between the conversion mechanism 5 and the spool (range switching member) 7. As shown in FIG. 1, intermediate member 150 is connected to the arm 6 and includes a range control shaft 34 which carries a detent lever 40.

Hereinafter, the details of the structural members will be described in order, starting with the shift lever 2.

Automatic transmission running ranges, namely, parking (P), reverse (R), neutral (N) and drive (D), are indicated on the shift lever unit (range selection unit) 2. The shift lever 2 is operated directly by the vehicle driver to select any one of the above-mentioned running ranges. Then, a shift signal S1 corresponding to the selected running range is generated. Instead of shift lever 2, any range selecting device may be used so long as it can reflect the intention of the vehicle driver, that is, so long as it generates a shift signal S1 corresponding to the running range selected by the vehicle driver. For example, a shift button, a shift switch, a voice input device, or the like, may be used.

The first control unit 3 generates a control signal based on the shift signal S1 generated by operation of the above described shift lever 2, and this control signal is used to control rotation of the motor 4. Further, a detection signal from the position sensor 8 for the position of the spool 7 is input to the first control unit 3. The first control unit 3 controls direction of rotation of the motor 4 and the timing of stopping and starting of the motor based on this detection signal. Thus, first control unit 3 is a control unit which switches the running range by controlling operation of the spool 7 by with the motor 4 based on the shift signal S1 from the shift lever 2. That is, the first control unit 3 is a control unit (SBW-CU) for controlling a so-called shift-by-wire system (SBW) and is disposed within the case 10.

Figure 2:
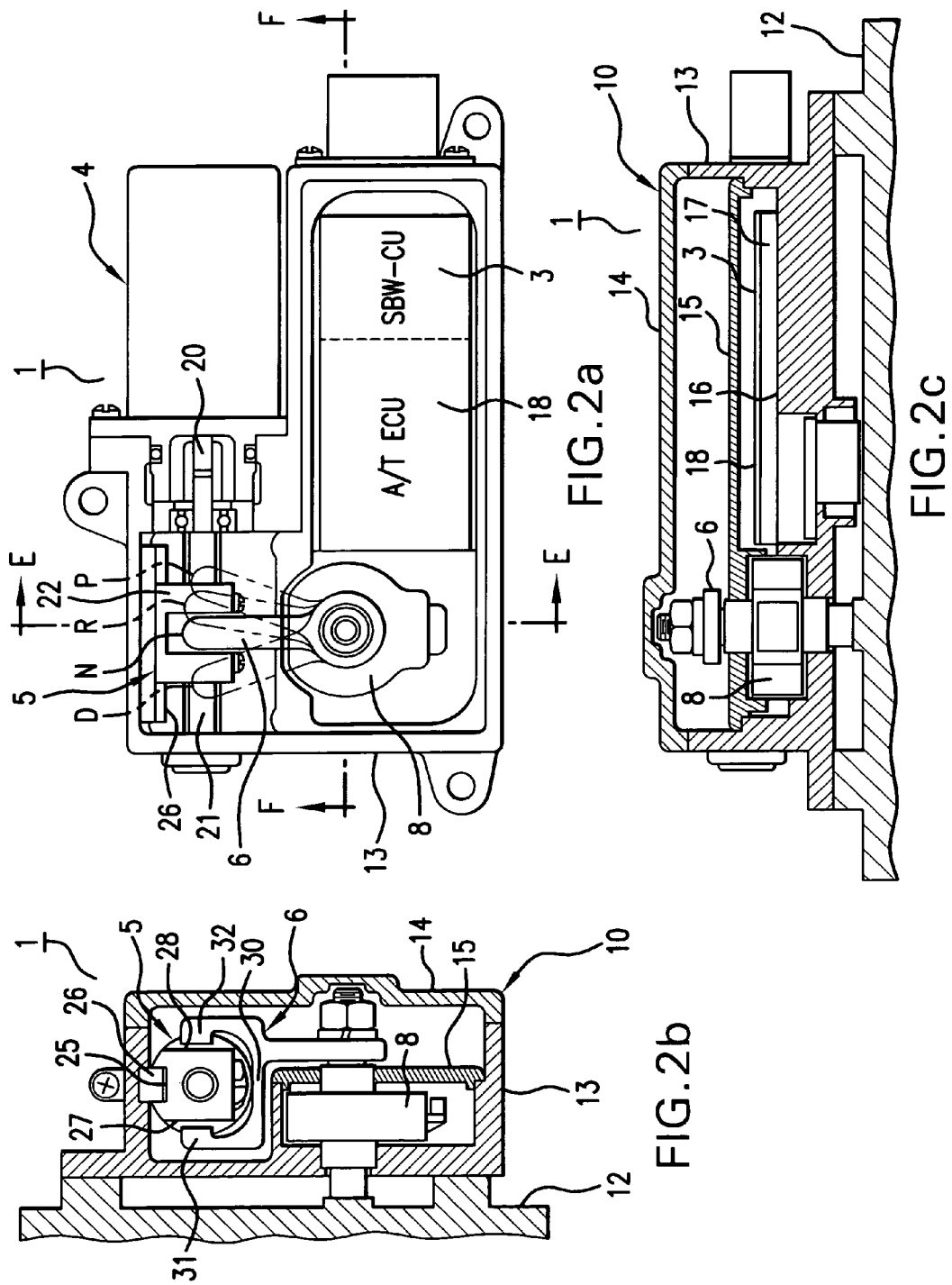
FIG. 2(a) is a plan view of an internal configuration of a case according to the first embodiment, with an upper cover and an intermediate cover thereof removed.
FIGS. 2(b), 2(c) are sectional views of the case member 10 taken along lines E—E and F—F, respectively, of FIG. 2(a)

Next, the case 10 and the internal configuration thereof will be described with reference to FIGS. 2(*a*), 2(*b*), 2(*c*). The case 10 includes a case main body 13 which is fixed to a section 12 (an A/T case) of the automatic transmission (A/T); an upper cover 14 that covers the top of this case main body 13; and an intermediate cover 15 that covers a section inside the case main body 13. FIG. 2(*a*) shows the A/T with the upper cover 14 and intermediate cover 15 removed. FIGS. 2(*b*), 2(*c*) are sectional views of the case member 10 taken along the lines E—E and F—F, respectively, in FIG. 2(*a*). As shown in these diagrams, the above described first control unit 3 is installed on a rectangular base 17 provided on the bottom 16 of the case main body 13. According to this embodiment, a second control unit 18 that acts as an A/T ECU (automatic transmission electronic control unit) for overall control of the entire automatic transmission is also installed on the base 17. It should be noted that the first and second control units 3 and 18 may be mounted on different supports arranged in a row on the same base 17 as shown in FIG. 2(*c*), or may be mounted on different portions of the same support which is then disposed on the base 17. If both the control units 3 and 18 are mounted on the same support, a wire harness for inter-connection thereof can be omitted, and the number of steps required for assembling the range switching device 1 can be reduced.

As shown in FIG. 2(*a*), the motor 4 is mounted on the exterior of the case 10 with its output shaft 20 inserted into the case 10. A DC motor having a permanent magnet is used for the motor 4, and the direction of rotation, time of rotation and timing of running are controlled by the above-described first control unit 3.

Figure 3:
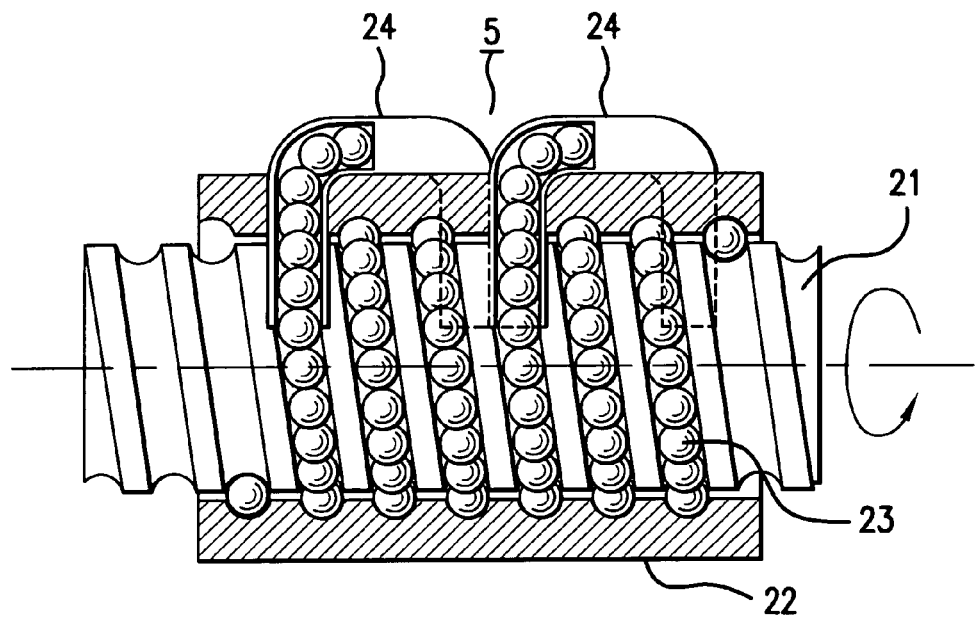
FIG. 3 is a longitudinal sectional view of a ball screw.

In this embodiment, a ball screw is used as the conversion mechanism 5. As shown in FIG. 3, the ball screw includes a ball screw shaft 21 which is driven by the motor 4; a ball nut (nut member) 22 which is engaged with the ball screw shaft 21 so as to be axially movable; and a plurality of balls 23 interposed between the ball screw shaft 21 and the ball nut 22. The ball nut 22 is engaged such that it is (a) held against rotation or (b) axially moved by the rotation of the ball screw shaft 21. When the ball screw shaft 21 is rotated, balls 23 revolve within a tube 24 integrated with the ball nut 22, thus causing the ball nut 22 to move axially. As shown in FIG. 1 and FIGS. 2(*a*), 2(*b*), the ball nut 22 has a generally cylindrical shape and has an axially extending guide groove 25 on its rear side (the upper side in FIG. 3(*a*)).

A guide rail 26 in parallel to the ball screw shaft 21 is moveably fitted within this guide groove 25 as shown in FIGS. 2(*a*), 2(*b*) to prevent rotation of the ball nut 22. Grooves (engagement grooves) 27 and 28, which are perpendicular to the ball screw shaft 21, are formed in upper and lower sections of the ball nut 22. An extension of the arm member 6, which will be described later, engages within these grooves 27 and 28. With this configuration, not only is the ball nut 22 movable in the axial direction by the rotation of the ball screw shaft 21, but also the ball screw shaft 21 can be rotated with relative ease by axial movement of the ball nut 22. "Relatively ease" as used here means as easily as the ball screw shaft 21 is rotated by operation of the detent mechanism 9, described later. Further, in this embodiment, the conversion mechanism 5 converts rotary motion to linear motion and, conversely, linear motion to rotary motion. Note that increasing the angle of the screw groove of the ball screw shaft 21 allows linear motion of the ball nut 22 to be more easily converted to rotary motion of the ball screw shaft 21.

The arm 6 has a branched section 30 with a distal end that is divided into an upper section and a lower section. Cylindrical protrusions 30 and 31, which engage with the grooves 27 and 28 in the above-described ball nut 22, are formed at the two distal ends of the branch section 30. A rectangular through hole 33 is provided in a base end section of the arm 6 as shown in FIG. 1. One end of the range control shaft 34 is fitted into this through hole 33. When the ball nut 22 moves axially the bifurcated (branched) end of the arm 6, arm 6 swings about the through hole 33, and this swinging motion rotates the range control shaft 34. Note that, reference letters P, R, N and D shown in FIG. 2(*a*) indicate positions of the arm member 6 that correspond, in order, to ranges P, R, N and D of the shift lever 2. In other words, if for example the P range is selected, the arm member 6 is located at the position indicated by P, as a result of which the spool 7 is located at the position P.

As shown in FIG. 1, the spool (range switching member) 7 constitutes part of a manual valve 35 disposed within the valve body 11. The spool 7 is freely axially movable (in the directions of arrows A, B), and when the spool 7 is moved axially, the hydraulic path within the valve body 11 is changed so as to set a predetermined running range. That is, the spool 7 can be moved to the position P corresponding to the P range, a position R corresponding to the R range, a position N corresponding to the N range, or a position D corresponding to the D range. Two discs 36 and 36 are fixed to a distal end of the spool 7 and an engagement groove 37 is formed between these discs 36 and 36. Detent lever 40 is engaged within this engagement groove 37.

As already described with reference to FIGS. 2(*a*) to 2(*c*), the position sensor 8 is disposed within the intermediate cover 15 inside the case 10. The range control shaft 34 extends through the center of this position sensor 8. A potentiometer, for example, may be used as the position sensor 8, which outputs a voltage corresponding to a rotational angle of the range control shaft 34. One end of the range control shaft 34 has a rectangular shaped section 38 which is fitted into the rectangular through hole 33 in the arm 6.

Figure 4:
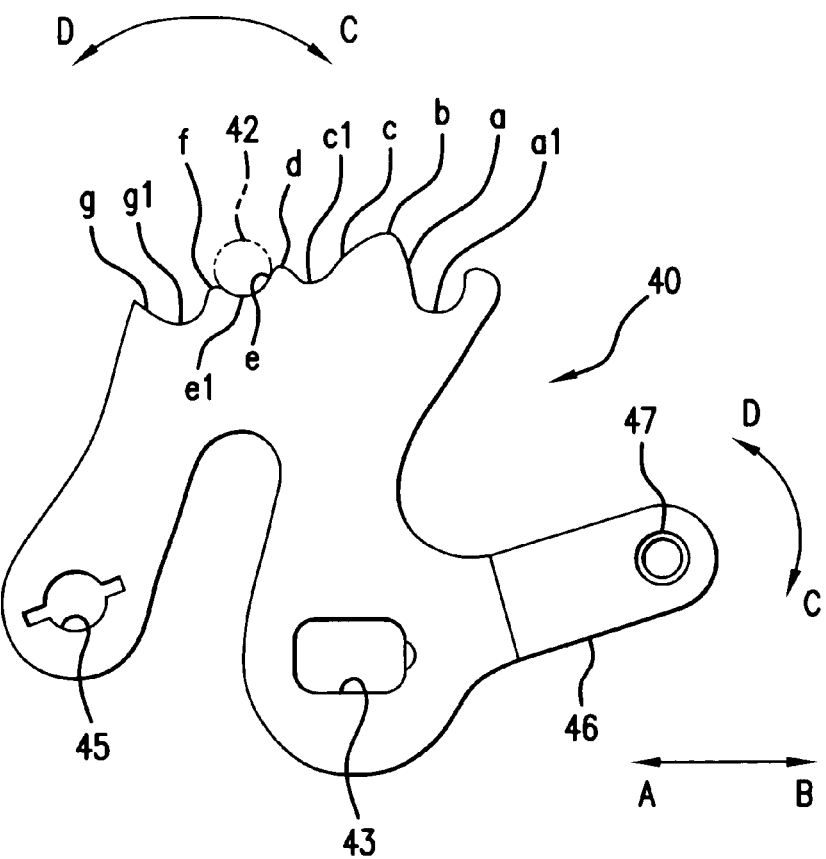
FIG. 4 is a plan view of a detent lever.

As shown in FIG. 1, the detent mechanism 9 includes the detent lever (detent member) 40, a detent spring 41 and a roller 42. The detent lever 40 is a plate-like member as shown in FIG. 1. A rectangular through hole 43 is formed in a lower section of detent lever 40 and a rectangular shaped section 44, formed at the end of the range selection shaft 34 opposite section 38, is fit into this through hole 43. The detent lever 40 swings in the directions of arrows C and D, with the range selection shaft 34 as a swing center (pivot point). A through hole 45, which allows connection with a parking mechanism (not shown), is provided in a left lower section of the detent lever 4, as shown in FIG. 4. Additionally, an arm section 46 is formed at a right lower portion thereof as shown in FIG. 4, such that the arm section 46 points to the right, and carries a pin 47 which protrudes from the arm section 46.

Pin 47 is engaged within the engagement groove 37 formed between the two discs 36 and 36 of the spool 7. The detent lever 40 has four range grooves a, c, e and g formed in order (from the right of FIG. 1) in a top edge thereof, as selection regions. Further, convex sections b, d and f are formed between and separate these range grooves a, c, e and g. The range grooves a, c, e and g basically correspond to the four positions of the spool 7, namely, the positions P, R, N and D. "Basically" is used here to indicate the fact that the range grooves a, c, e and g are regions of a given width (selection regions) and thus, strictly speaking, selection positions a1, c1, e1 and g1 within these range grooves a, c, e and g correspond to the positions P, R, N, D of the spool 7. The selection positions a1, c1, e1 and g1 will be described following an explanation of the detent spring 41.

The detent spring 41 is formed as a generally rectangular member and as shown in FIG. 1, has a base end 48 which is fixed to the valve body 11a and a bifurcated section 50 which is formed at a distal end thereof. A roller 42 is supported in the bifurcated section 50 so as to be freely rotatable. As a whole, the detent spring 41 acts as a leaf spring, so that the roller 42 carried by its distal end is pressed against the inclined faces of one of the range grooves a, c, e and g in the detent lever 40, thereby accurately positioning and holding the detent lever 40. That is, when the roller 42 at the distal end of the detent spring 41 is positioned within the range groove a in the detent lever 40, the detent lever 40, which is capable of swinging with relative ease, is positioned in the selection position a1 by an urging force of the roller 42 derived from the elastic force of the detent spring 41.

Thus, the selection position a1 is a point at which the range groove a makes contact with the roller 42. Likewise, in the case where detent lever 40 is maintained in its swinging-capable state and the roller 42 is disposed within the range groove c, the selection position c1 in the range groove c is a point at which the range groove c makes contact with the roller 42. Moreover, the selection position e1 within the range groove e and the selecting position g1 within the range groove g are set in the same way as the above described selection positions a1 and c1, and thus description thereof is omitted.

The selection positions a1, c1, e1 and g1 correspond exactly, in this order, to the positions P, R, N and D of the spool 7. Reference positions for pivoting (swinging) in the directions of arrows C and D are set in the detent lever 40, and the relation between the angles from the reference position to the selection positions a1, c1, e1 and g1 and the convex sections b, d and f, and the magnitudes of output voltages from the position sensor 8 corresponding to each angle are memorized in the first control unit 3.

With this embodiment, as described above, the configuration is such that the swinging motion (pivoting motion) of the detent lever 40 in the directions of arrows C and D and the movement of the spool 7 in the directions of arrows A and B are inter-linked, that is, the positions of the detent lever 40 correspond in a one-to-one manner with the positions of the spool 7. Given this, the spool 7 is controlled accurately by accurately controlling the detent lever 40 without controlling the position of the spool 7 directly.

Next, the operation of the range switching device 1 with the above configuration will be described using the example of switching from the P range to the R range.

When the P range is selected, the roller 42 of the detent mechanism 9 is positioned at the selection position a1 within the range groove a in FIG. 4. If the vehicle driver moves the shift lever 2 from its P range position to its R range position, a shift signal S1 corresponding thereto is input to the first control unit 3. The motor 4 is rotated by the first control unit 3 so that the ball screw shaft 21 is rotated. Due to this rotation, the ball nut 22 is moved to the left in FIG. 2(*a*). Along with this, the arm member 6 swings to the left. Consequently, the detent lever 40 is rotated in the direction of arrow C by the range control shaft 34, so that the spool 7 is moved in the direction of arrow B. When the output voltage of the position sensor 8 reaches a value that corresponds to the convex section b in FIG. 4, the first control unit 3 stops the rotation of the motor 4. As a result, the roller 42 moves from the range groove a, passes over the convex section b, and enters the range groove c.

If the motor 4 is stopped, the detent lever 40 is rotated by the urging force of the roller 42 that is generated by the elastic force of the detent spring 41. The roller 42 is positioned and held accurately in the selection position c1 within the range groove c by this rotation. Consequently, the spool 7 that was located at the position P is accurately repositioned at the position R. If the motor 4 is stopped and the detent lever 40 is rotated by the action of the detent mechanism 9, the ball nut 22 is axially moved by the range control shaft 34 and the arm member 6, so that the ball screw shaft 21 is rotated.

In this way, with the range switching device 1 of this embodiment, when the spool 7 is moved from the position P to the position R in accordance with the vehicle driver switching the running range from the P range to the R range, control of the motor 4 is executed until the roller 42 passes over the convex section b and enters the range groove c. After this, the roller 42 that is located within the range groove c is precisely positioned therein and held at the selection position c1 by pulling action of the detent mechanism 9. Consequently, the spool 7 can be accurately positioned at R, which corresponds to the selected traveling range R, using a simple configuration and control.

It should be noted that selection of other running ranges is carried out in the same way.

According to this embodiment, the conversion mechanism 5 includes a ball screw and also the arm 6. Thus, as compared to the conventional conversion mechanism having a plurality of gears, the configuration necessary for deceleration is simplified, thereby reducing the overall size of the range switching device 1. Further, because the arm member 6 converts the linear, axial movement of the ball nut 22 to the swinging motion, a large reduction ratio can be achieved. Further, the reduction ratio can be changed simply by changing the length of the arm member 6.

Moreover, according to this embodiment, the first and second control units 3 and 18, which are electronic components, are disposed within the case 10 together with the position sensor 8, which is also an electronic component, and are covered by the intermediate cover 15. In other words, a double cover configuration is provided. Consequently, the first and second control units 3 and 18 and the position sensor 8 are separated by the intermediate cover 15 from the mechanical components such as the conversion mechanism 5, the arm member 6, and the like, which are disposed outside of the intermediate cover 15 but within the same case 10. Thus, lubricant and dust from the mechanical components can be effectively prevented from coming into contact with the first and second control units 3, 18 and the position sensor 8. By positioning the first and second control units 3, 18 and the position sensor 8 in the vicinity of each other as described above, the length and quantity of the wire harnesses required for connecting these members can be minimized, thereby simplifying the wiring system. Consequently, reductions in component cost and assembly cost, as well as space saving, are achieved, and further, electromagnetic noise resulting from a long wire harness can be reduced.

Second Embodiment

FIGS. 5(a), 5(b) and 5(c) show a range switching device 50 according to a second embodiment of the invention. These figures correspond to FIGS. 2(a), 2(b), 2(c), in that order. Structural members that are the same as those shown in FIGS. 2(a), 2(b), 2(c) are denoted with the same reference numerals, and a description thereof is omitted.

In this second embodiment, the first control unit 3 (the SBW-CU) and the second control unit 18 (the A/T ECU) are respectively positioned on two different (upper-lower) levels.

The first control unit 3 is positioned on the bottom 16 of the case main body 13 of the case 10 and the second control unit 18 is disposed on a supporting member 51 that is disposed above the first control unit 3. The first control unit 3 is positioned such that it is completely overlapped by the second control unit 18.

With this second embodiment, as compared to the case of a side by side arrangement, the occupied area can be reduced by an amount equivalent to the overlapping areas of the first and second control units 3 and 18. Additionally, the first control unit 3 can be added to a conventional second control unit 18 without the need for large changes in design and arrangement. As a result, a conventional range switching device can be used effectively.

Further, in this embodiment as well, the first and second control units 3 and 18 and the position sensor 8 are disposed inside the intermediate cover 15 in the same manner as in the first embodiment.

Third Embodiment

FIGS. 6(a), 6(b) and 6(c) show a range switching device 60 according to a third embodiment of the invention. In the range switching device 60 shown in FIG. 6, spur gears 52a and 52b are interposed between the output shaft 20 of the motor 4 and the ball screw shaft 21 of the conversion mechanism 5.

The spur gear 52a, which has the smaller diameter, is fitted to the output shaft 20 of the motor 4, while the spur gear 52b, which has the larger diameter, is fitted to the ball screw shaft 21. The spur gears 52a and 52b are meshed with each other. Consequently, the gear ratio can be increased, whereby the size of the motor 4 can be reduced.

Fourth Embodiment

Figure 7B:
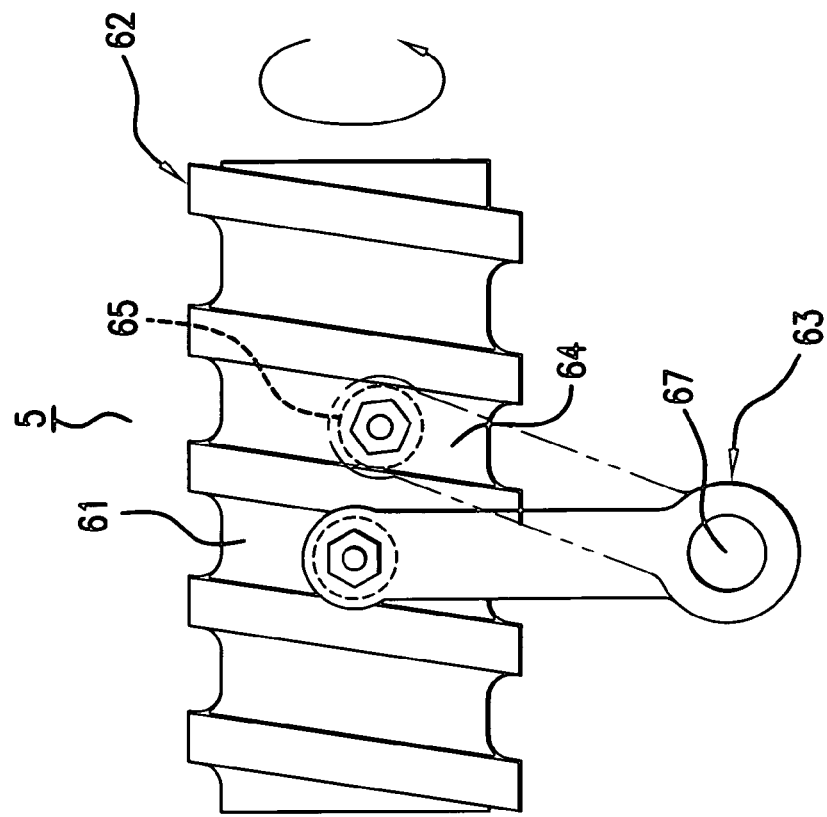
FIGS. 7a and 7b illustrate a conversion mechanism according to a fourth embodiment.
Figure 7A:
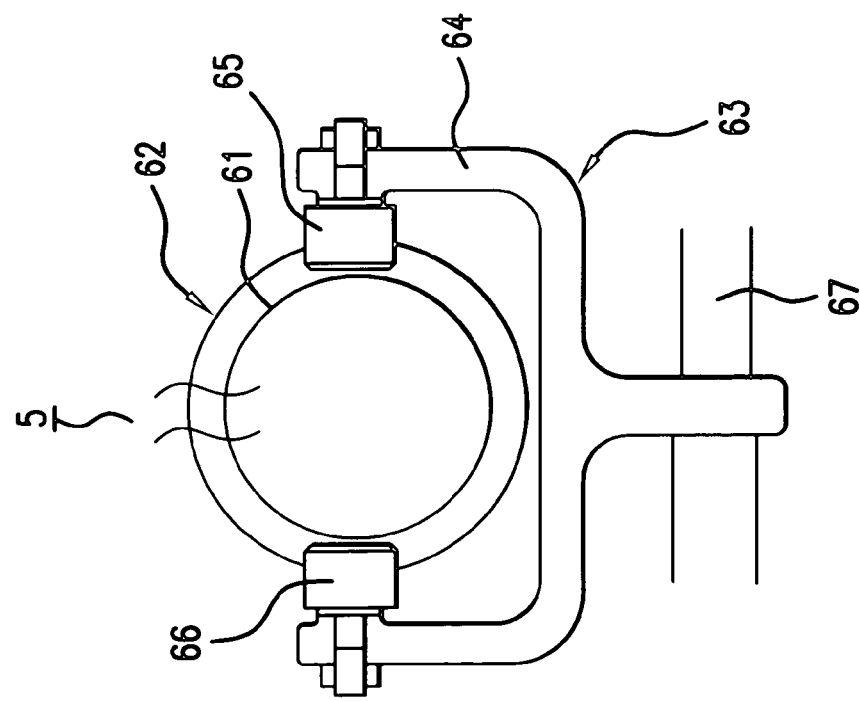

While in the above described first to third embodiments a ball screw is utilized as the conversion mechanism 5, the fourth embodiment employs a combination of a cam and a cam follower as the conversion mechanism 5, as shown in FIGS. 7(a), 7(b).

As shown in FIGS. 7(a) and 7(b), the conversion mechanism 5 includes a shaft-shaped cam member 62 having a spiral cam groove 61; and two roller shaped cam followers 65 and 66 which are respectively rotatably supported by distal ends of a bifurcated section 64 at opposite sides of arm member 63. These two cam followers 65 and 66 engage with the cam groove 61 at opposite sides of the cam member 62. The arm member 63 is supported by a shaft 67 for swinging (pivoting).

With the above-described conversion mechanism 5 when the cam member 62 is rotated, the two cam followers 65 and 66 roll along the spiral cam groove 61 so that the arm member 64 swings with respect to the shaft 67.

This fourth embodiment has a configuration providing an extremely small coefficient of friction, like the conversion mechanism 5 of the first to third embodiments that use a ball screw. Further, since structural members corresponding to the ball nut 22 and the balls 23 are unnecessary, as compared to the first to third embodiments, the configuration is simplified to that extent. The operation and effects of the fourth embodiment are substantially the same as the first to third embodiments.

Fifth Embodiment

Figure 8:
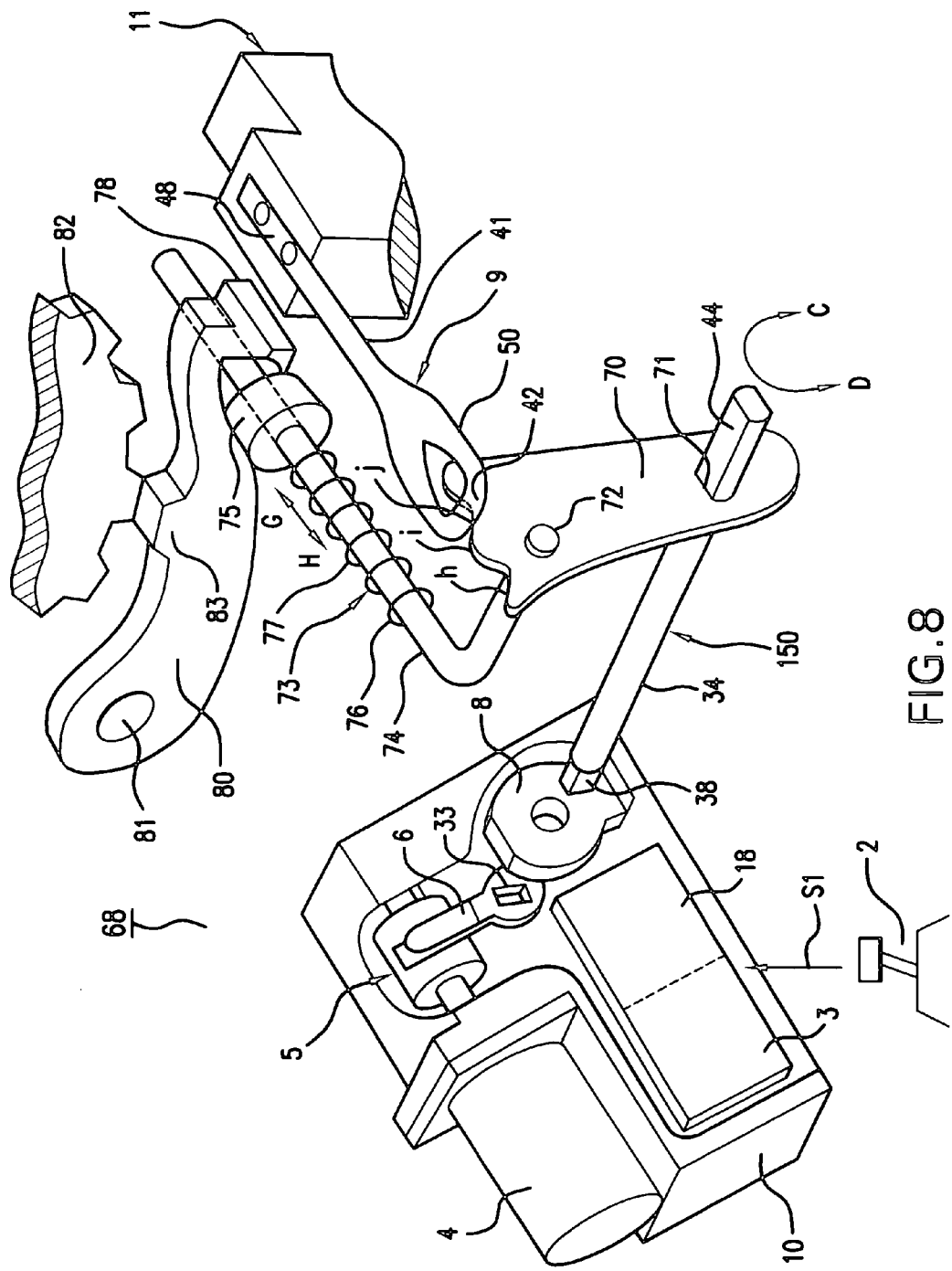
FIG. 8 is a perspective view of a range switching device according to a fifth embodiment.

FIG. 8 shows a range switching device 68 of a fifth embodiment of the present invention. This fifth embodiment illustrates an example of the range switching device of the present invention applied to a parking mechanism. Note that, structural members that are the same as those of the first embodiment are denoted with the same reference numerals, and a description thereof is omitted.

According to the first embodiment described above, the range switching member which is moved by the arm member 6 is the spool 7, which is moved between four positions, namely, positions P, R, N and D. In contrast, according to this fifth embodiment, the range switching device is a parking mechanism 73 having only two positions, namely, a position P (a locked position) and a non-P position (a released or unlocked position).

In this fifth embodiment, the configuration of the detent lever 70 is different than that of the detent lever 40 of the first embodiment. The detent spring 41 and the roller 42, which are the other components of the detent mechanism 9, are the same as those of the first embodiment.

The detent lever 70 of this fifth embodiment, as shown in FIG. 8, has a rectangular through hole 71 formed in a lower section thereof. The rectangular section 44 formed at one end of the range selection shaft 34 is fit into this through hole 71. A through hole 72 receives a parking rod 74 of a parking mechanism 73 and is formed in a top section of the detent lever 70. Range grooves h and j are provided in the top edge of the detent lever 70 as two selection regions. Further, a convex section i is formed between these range grooves h and j. The range grooves h and j basically correspond, respectively, to the locked position and the released position of the parking rod 74, which will be described later. Here, "basically correspond" indicates the fact that the range grooves h and j are regions (selection regions) having a given width, and that, strictly speaking, selection positions h1 and j1 (not shown) set in part of these range grooves h and j correspond to the lock position and the release position of the parking rod 74. Because the relationship between the range grooves h and j and the selection positions h1 and j1 is the same as the relationship between the range grooves a, c, e and g and the selection positions a1, c1, e1 and g1 of the first embodiment, a description thereof will be omitted. Note that, a reference position for when the detent lever 70 rotates (swings) in the directions of arrows C and D is set, and the relationships between the angles from this reference position to the selection positions h1 and j1 and the convex section I, and the magnitudes of an output voltages from the position sensor 8, corresponding to each angle, is memorized in the first control unit 3.

As shown in FIG. 8, the parking mechanism 73 includes a parking rod 74 having a proximal end that is bent in the shape of the letter L and which engages the detent lever 70; a conical wedge 75 (lock member) which is movably fitted on a distal end of the parking rod 74; a spring (compression spring) 77 which is connected to a flange section 76 fixed on the parking rod 74 and the wedge 75; a support 78 disposed below the distal end of the parking rod 74; and a parking pole 80 which can swing freely so that the wedge 75 is inserted into or removed from between the support 78 and the parking pole 80. The parking pole 80 is disposed such that it is capable of swinging freely in a substantially vertical direction with respect to an axis point 81 at the proximal end. A pawl 83 capable of engaging with and disengaging from a parking gear 82 is fixed on an output shaft (not shown) of the automatic transmission and protrudes from the upper side of the parking pole 80.

Next, as an example, of operation of the parking mechanism 73, switching from the non P range to the P range by the shift lever 2 will be described. When the P range is selected, the detent lever 70 is rotated in the direction of arrow C by rotation of the motor 4 via the conversion mechanism 5, the arm member 6 and the range control shaft 34. Consequently, the parking rod 74 is moved in the direction of arrow G. At this time, the flange section 76 that is integrally formed with the parking rod 74 urges the wedge 75 in the direction of arrow G via the spring 77. As a result of this urging force, the wedge 75 is inserted between the support 78 and the parking pole 80, thereby pushing up the parking pole 80 such that the pawl 83 engages with the parking gear 82. At this time, if the pawl 83 comes into contact with a protruding tooth of the parking gear 82, the wedge 75 cannot be inserted between the support 78 and the parking pole 80, and thus the wedge 75 remains in a waiting (standby) position where it is biased by the spring 77. If the vehicle wheels turn slightly in this condition, the parking gear 82 is rotated, and the pawl 83 enters into a tooth recess of the parking gear 82, thereby achieving parking lock.

In order to release the parking lock, the shift lever 2 is moved to a non P range from the P range, whereby the detent lever 70 is rotated in the direction of arrow D by the motor 4, the conversion mechanism 5, the arm member 6, and the like. Consequently, the parking rod 34 is moved in the direction of arrow H, so that the wedge 75 is pulled out from between the support 78 and the parking pole 80. As a result, the parking pole 80 swings downward, such that the pawl 83 is withdrawn from tooth recess in the parking gear 82. With this, lock release is completed.

As the conversion mechanism 5 of this embodiment, for example, a ball screw like that shown in FIG. 3, or a combination of the cam member 62 with the cam followers 65 and 66 shown in FIG. 7 may be used.

According to the range switching device 68 of this embodiment, when the parking rod 74 is moved from the released position to the position P in accordance with the vehicle driver switching the running range from the non P range to the P range, control of the motor 4 is executed until the roller 42 passes over the convex section i of the detent lever 70 and enters the range groove h. Following this, the roller 42 located in the range groove h is precisely positioned and held within the selection position (not shown) by the action of the detent mechanism 9. Thus, the parking rod 74 can be accurately positioned at the position P, corresponding to the P range which is the selected running range.

In this fifth embodiment, as described above, the range switching device of the present invention is only used for switching between two positions, namely, the locked position (position P) and the released position (the non-P position). In this case, as described above, the parking mechanism 73 corresponds to the range switching device. It should be noted that, in this example, the selection of the running ranges N, D and R is carried out by another mechanism.

Sixth Embodiment

The internal configuration of the case 10 of a range switching device 100 according to this sixth embodiment will be described with reference to FIGS. 9, 10(a), 10(b) and 11. In the description which follows, structural members having the same configuration and operation as those of first to fifth embodiments are denoted with the same reference numerals, and a description thereof is omitted.

Figure 9:
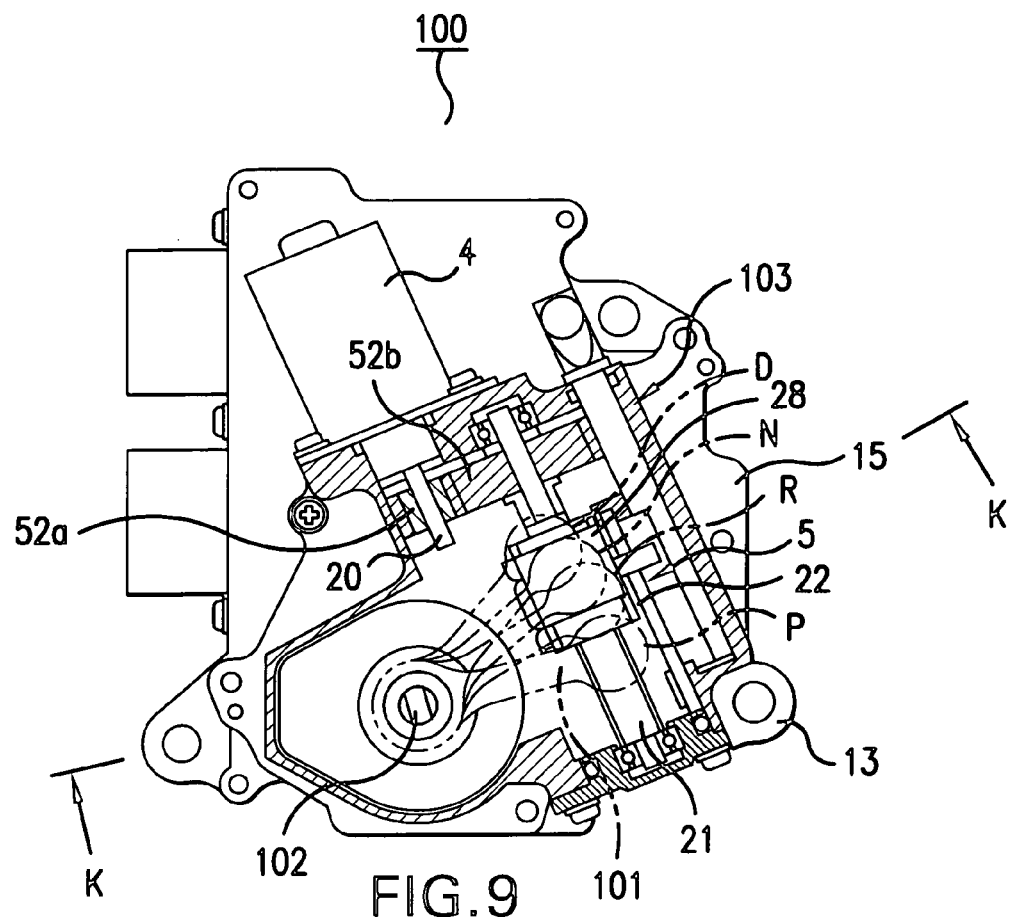
FIG. 9 is a sectional view of a sixth embodiment with its upper cover cut away.

FIG. 9 is a view of the case 10, which includes the case main body 13, the intermediate cover 15 and the upper cover 14, as seen from the side of the upper cover 14 when the upper cover 14 is cut away; FIG. 10 is a view of the internal configuration as seen from the side of the upper cover 14 when the upper cover 14 and the intermediate cover 15 are removed; and FIG. 11 is a perspective view taken along the line K—K of FIG. 9. Note that FIG. 11 illustrates a state where the upper cover 14 is attached, rather than cut away as in FIG. 9.

The case 10 of the range switching device 100 shown in these figures includes the case main body 13 fixed on the A/T case 12, the upper cover 14 that covers this case main body 13, and the intermediate cover 15 that covers a section inside of the case main body 13.

As shown in FIG. 9, the motor 4 is installed outside the case 10 with its output shaft 20 inserted into the case 10. A small spur gear 52a is fixed on this output shaft 20 and a large spur gear 52b fixed on the ball screw shaft 21 is engaged with the spur gear 52a. Accordingly, respective forward and reverse rotations of the motor 4 are decelerated by these spur gears 52a and 52b and transmitted in the form of normal and reverse rotations, respectively, of the ball screw shaft 21. The ball nut 22 that meshes with the ball screw shaft 21 via the balls 23 (see FIG. 3) is moved in one or the other direction along the length of the ball screw shaft 21 by the normal/reverse rotation of the ball screw shaft 21. The ball nut 22 is provided with a rotation stopper described hereinafter, which differs from structure previously described.

The grooves 27 and 28 (groove 27 is not shown in FIGS. 9 to 11) are formed in the aforementioned ball nut 22 and the distal ends of an arm member 101 (which differs from those of the above-described embodiments) engage within these grooves 27 and 28. A range control shaft 102 is fitted to a proximal end of the arm member 101. As the ball nut 22 moves along the ball screw shaft 21, the arm member 101 swings so that the range control shaft 102 rotates. As described with regard to FIG. 1, the spool 7 is moved in the direction of arrow A or that of arrow B by the rotation of this range control shaft 102.

Further, with this sixth embodiment as well, a manual release mechanism 103 is provided to enable switching of the running range in the event of a failure in the motor or the like.

Further, according to this sixth embodiment, the configuration and manner of housing of a first control unit 104 (an SBW CU) and a second control unit 105 (an A/T ECU), that control the rotation of the motor 4, are different from those of the above-described embodiments.

Hereinafter, five features (points (1) to (5) below) of this sixth embodiment that are different from the first to fifth embodiments will be described in order.

Manual Release Mechanism

According to this sixth embodiment, the range switching device 100 includes a manual release mechanism 103 as an auxiliary switching unit. With the previous embodiments, the ball screw shaft 21 cannot be rotated if a failure such as breakage or short-circuit occurs in the motor 4, which is the driving source, whereby the running range cannot be switched.

Figure 12A:
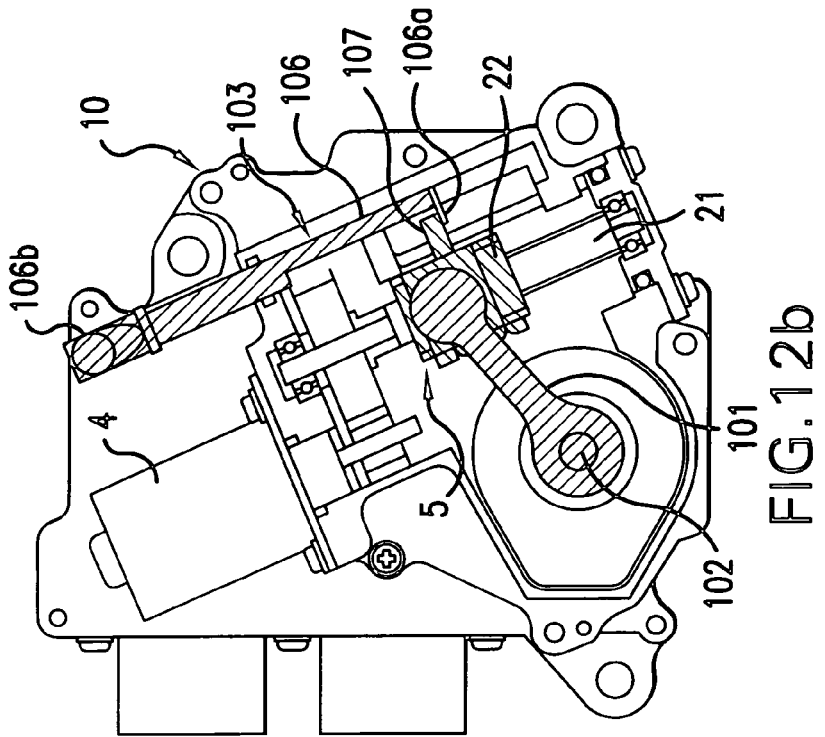
FIGS. 12(a) and 12(b) illustrate the configuration and operation of the manual release mechanism in the sixth embodiment.
Figure 12B:
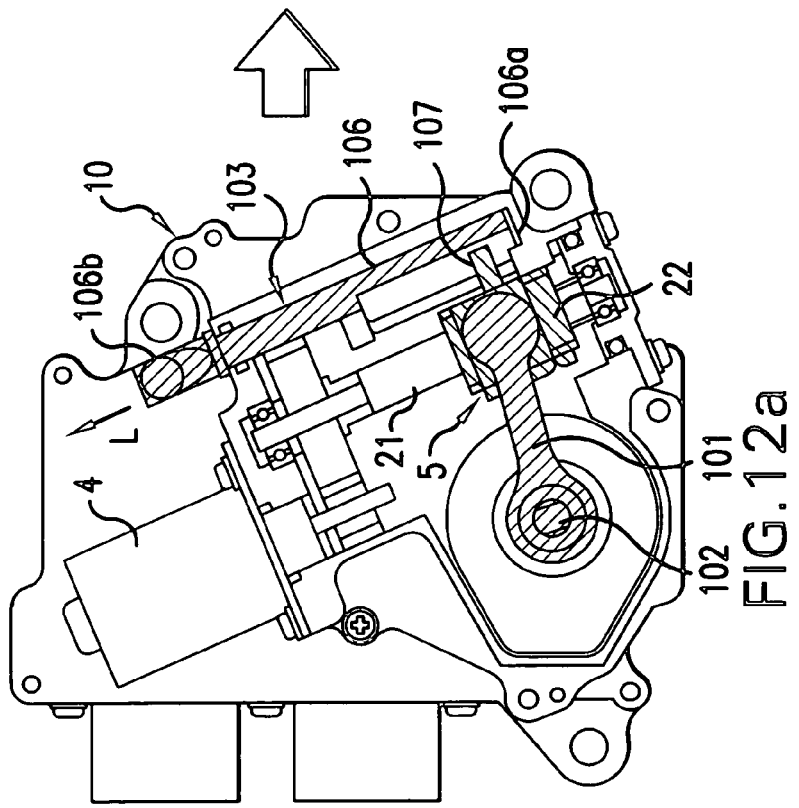

To address this problem, this sixth embodiment includes a manual release mechanism 103 as shown in FIGS. 12(*a*), 12(*b*).

The manual release mechanism 103 shown in FIGS. 12(*a*) and 12(*b*) includes a release rod 106 which is disposed in parallel with the ball screw shaft 21 and which is supported by the case 10 so as to be movable lengthwise; and a protrusion 107 which extends from the ball nut 22. A hook (engagement element) 106*a* which is capable of engaging the protrusion 107 is provided at a distal end section of the release rod 106. Further, a wire (not shown) for pulling the release rod 106 in the direction of arrow L is connected to a proximal end section 106*b*.

If, for example, the motor 4 fails to operate when the P range is selected, namely, when the state shown in FIG. 12(*a*) exists, the motor 4 is incapable of swinging the arm member 101 via the ball screw shaft 21 and the ball nut 22, and thus cannot change the running range.

In this case, the release rod 106 is moved in the direction of arrow L due to the pull of the aforementioned wire, and the ball nut 22 is moved in the direction of arrow L as a result of the hook 106*a* of the release rod 106 engaging the protrusion 107 of the ball nut 22. As a result of this movement, the arm member 101 whose distal end section engages the ball nut 22 is swung and forcibly moved to a position that corresponds to the range N as shown in FIG. 12(*b*).

With the above-described manual release mechanism 103, the ball nut 22 is driven by the release rod 106. Thus, a release weight (the force which pulls the wire) and a release stroke can be appropriately set, depending on the length of the arm member 101, and a compact configuration can be provided.

Figure 13A:
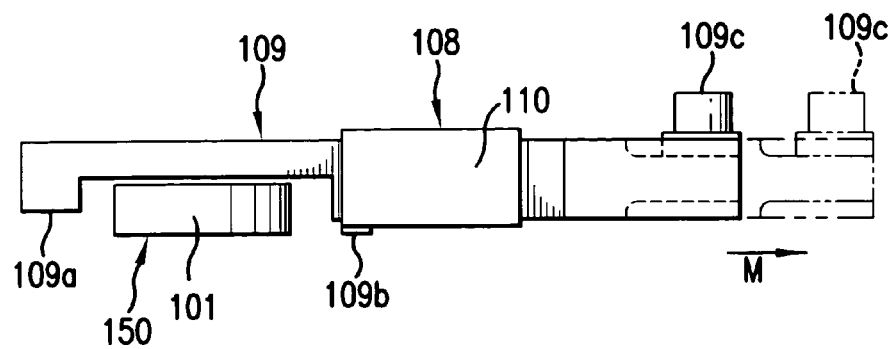
FIGS. 13(a) and 13(b) illustrate the configuration and operation of another manual release mechanism.
Figure 13B:
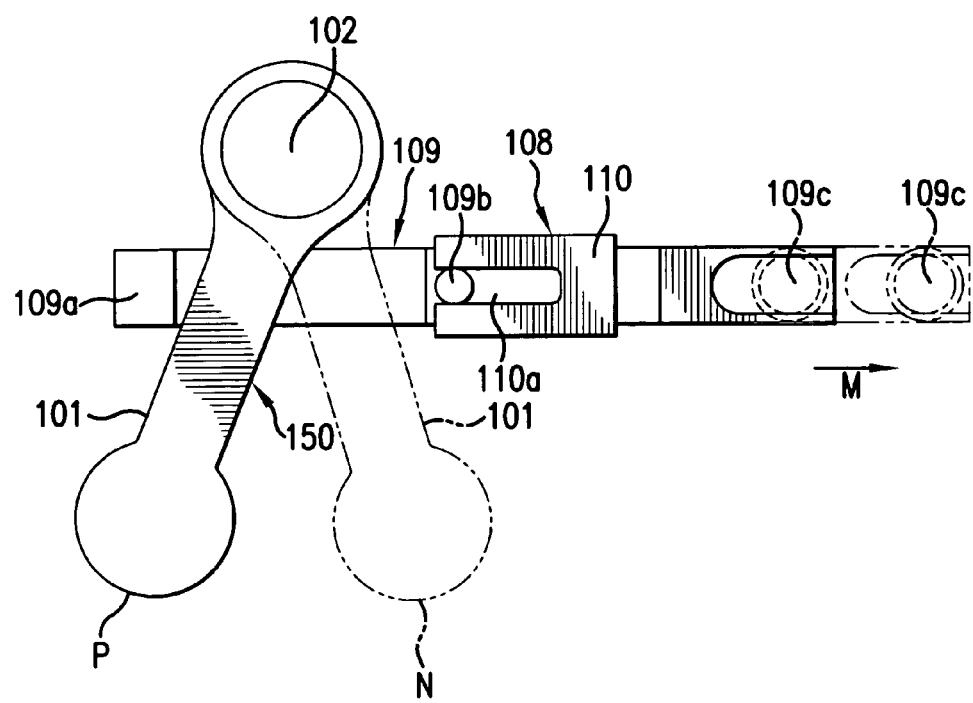
Figures 14A, 14B:
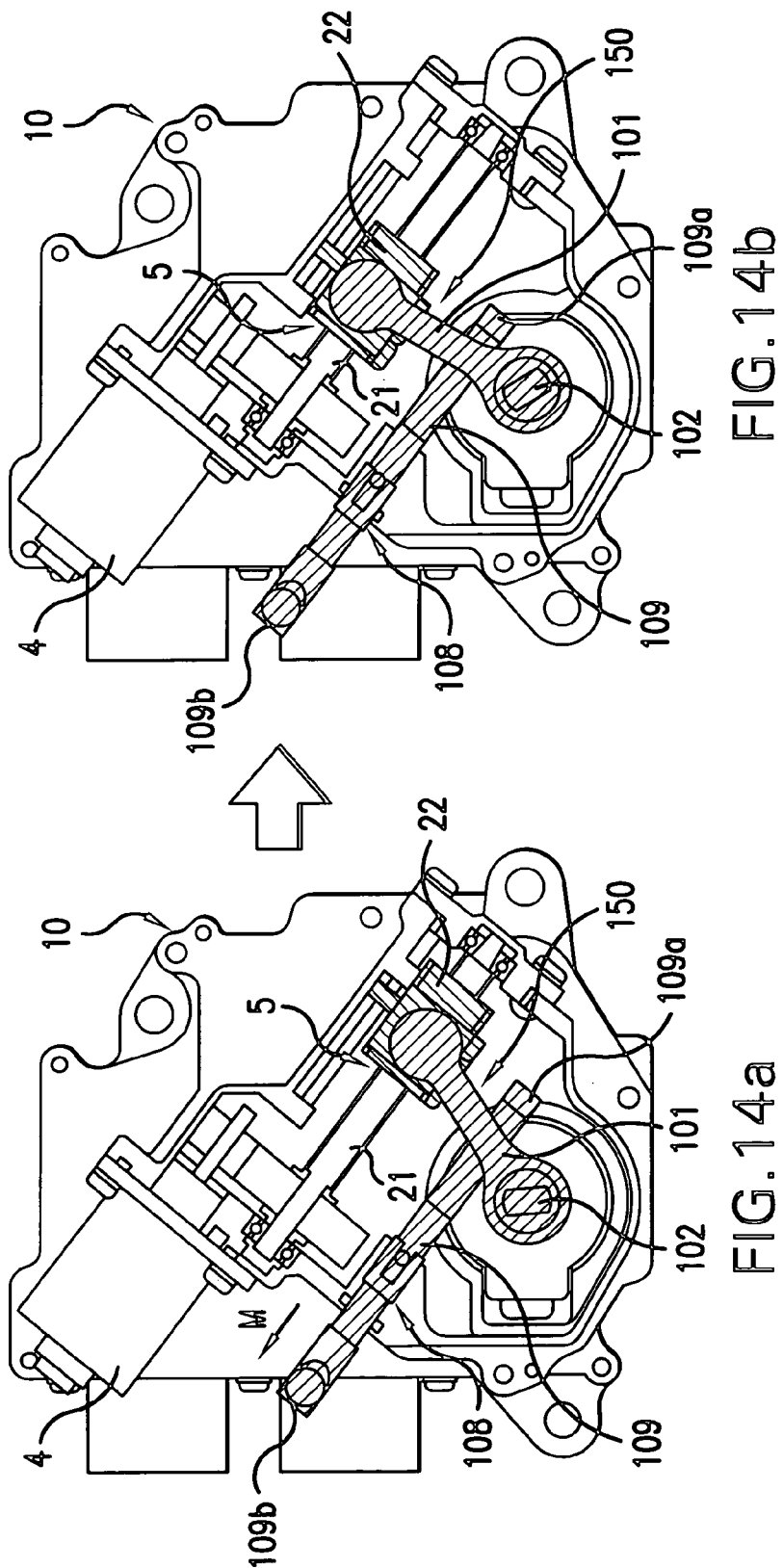
FIGS. 14(a) and 14(b) illustrate the operation of the manual release mechanism shown in FIG. 13 when assembled in the case.

FIGS. 13(*a*), 13(*b*) show another example of a manual release mechanism. FIGS. 14(*a*), 14(*b*) illustrate the operation when this manual release mechanism 108 (auxiliary switching unit) is incorporated in the case 10. As shown in FIGS. 13(*a*), 13(*b*), the manual release mechanism 108 moves the arm member 101 directly instead of the ball nut 22. The manual release mechanism 108 includes a release rod 109 and a guide sleeve 110 that supports an intermediate section of the release rod 109 so that the release rod 109 is movable lengthwise. A hook (engagement element) 109*a* for engaging an intermediate position in the length of the arm member 101 is formed at a distal end of the release rod 109. A convex section 109*b*, which functions as a rotation stopper for the release rod 108, protrudes from an intermediate portion of the release rod 109 for movement along a groove 110*a* formed in the guide sleeve 110 having an open distal end. Further, a wire similar to the one described previously (not shown), namely, a wire capable of pulling the release rod in the direction of arrow M, is connected to a proximal end 109*c* of the release rod 109. If a failure occurs in the motor 4 (see FIG. 12) when the P range is selected, that is, when the arm member 101 is located at the position indicated by the solid line in FIGS. 13(*a*), 13(*b*) and the solid line in FIG. 14(*a*), the arm member 101 cannot be swung by the motor 4 via the ball screw shaft 21 and ball nut 22, as a result of which the motor cannot switch the running range.

In this case, the release rod 109 is moved in the direction of arrow M by the aforementioned wire being pulled, so that the hook 109*a* of the release rod 109 engages the arm member 101, whereby the arm member 101 is swung. Consequently, the arm member 101 can be forcibly moved to the position indicated by the dotted line in FIGS. 13(*a*), 13(*b*) and the solid line in FIG. 14(*b*).

With the manual release mechanism 108 described above, the element driven by the release rod 109 is the arm member 101. Accordingly, the manual release mechanism 108 can be freely disposed regardless of the position of the ball nut.

Ball Nut Rotation Stopper

According to the first embodiment, as shown in FIG. 2, rotation of the ball nut 22 is stopped by fitting the guide groove 28 formed in the ball nut 22 to the guide rail 26 such that it has a degree of play. However, this configuration suffers from the problem that the configurations of the guide rail 26 and the case member 20 to be installed thereon are complicated, thereby requiring a number of assembly steps.

Figure 15B:
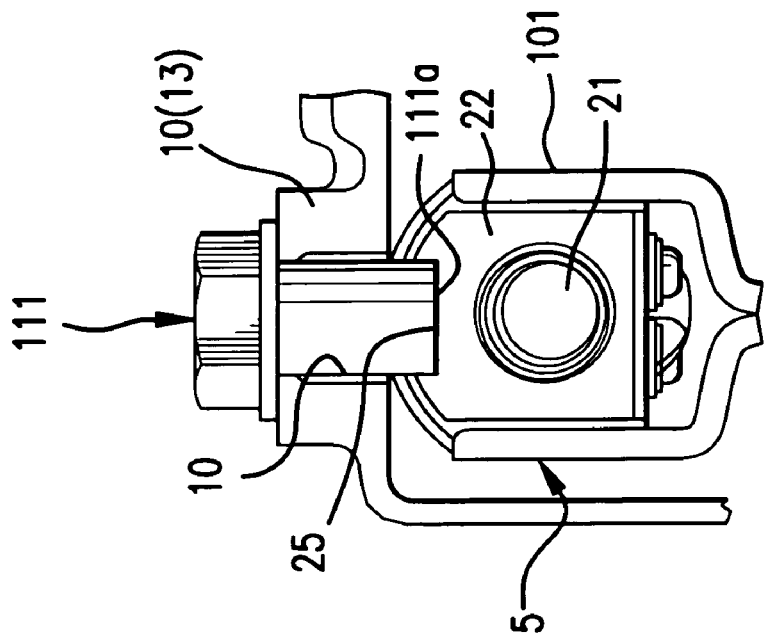
FIGS. 15(a) and 15(b) illustrate a ball nut rotation stopper of the sixth embodiment.
Figure 15A:
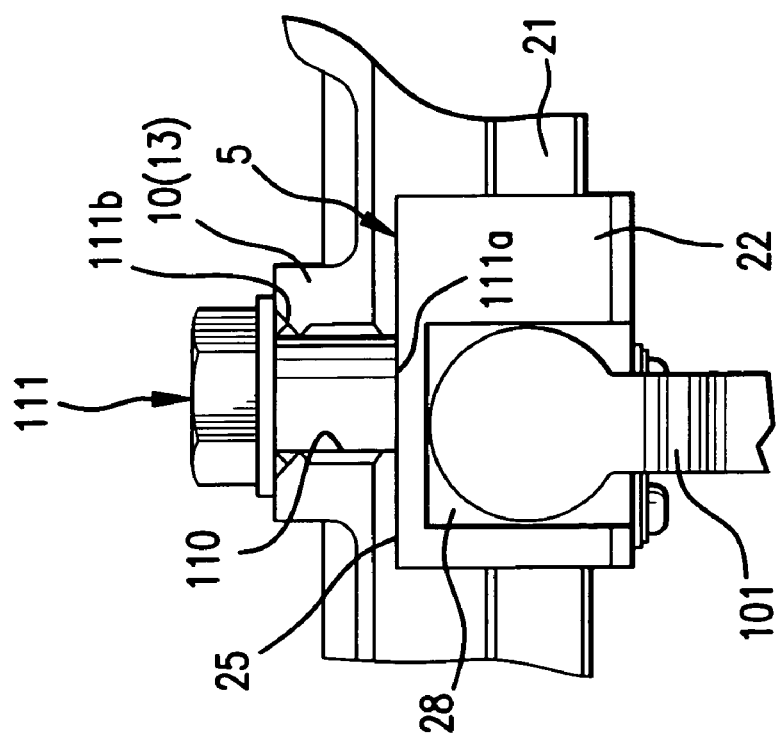

Thus, according to this sixth embodiment, as shown in FIGS. 15(*a*), 15(*b*), the stoppage of rotation of the ball nut 22 is provided for by: providing a bolt hole 110 in the case 10, and fastening a bolt (pin-like member) 111 into this bolt hole 110 such that a distal end 111*a* of the bolt 111 is fitted into the guide groove 25 in the bolt nut 22 with a degree of play. By mounting a ring seal 111*b* between the case 10 and the bolt 111, the inside of the case member 10 becomes sealed.

As compared to the case where the aforementioned guide rail 26 is used, the configuration of the sixth embodiment is simplified, whereby a reduction in the number of process steps is possible.

FIGS. 16(*a*), 16(*b*) show another example of structure for stopping rotation of the ball nut (the rotation stopping unit). As shown in FIGS. 16(*a*), 16(*b*), the structure for the rotation stopping of the ball nut 22 includes a hole 10*a* formed in the case 10, and a long pin (engagement member) 112, that runs in parallel with the ball screw shaft 21, inserted into this hole 10*a* such that it is fitted with a degree of play into a guide groove 113 in the ball nut 22. Because this structure is realized simply by inserting the pin 112 into the hole 10*a*, the need for a bolt hole in the case 10 is eliminated, whereby the special seal ring 111*b* (see FIG. 15(*a*)) becomes unnecessary.

(3) Arm Member

FIGS. 17 to 20 show various shapes of arm members 101A to 101D. FIGS. 17(a), 18(a), 19(a) and 20(a) each show a section perpendicular to the axis of the ball nut 22. FIGS. 17(b), 18(b), 19(b) and 20(b) are right side views showing two respective outlines when the respective arm members 101A to 101D are positioned perpendicular to the ball nut 22, and tilted at about 20° toward the right side. FIG. 19(c) illustrates the same state as 19(b).

Each arm member 101A to 101D has a bifurcated section 114. Among the different arm members 101A to 101D, only the portions that fit into the grooves 27, 28 (hereinafter referred to as "cam followers") are different in shape.

In FIGS. 17(a), 17(b), a cam follower 115 is formed with a circular shape and distal ends 114a of the bifurcated section 114 are tapered so as to connect to the bottom section (given the perspective of the figure) of this cam follower 115.

In FIGS. 18(a), 18(b), a cam follower 116 has a circular shape and is formed by bending the distal ends 114a of the bifurcated section 114 inwards toward the ball nut 22 side, and inserting them into the grooves 27 and 28.

Figure 19C:
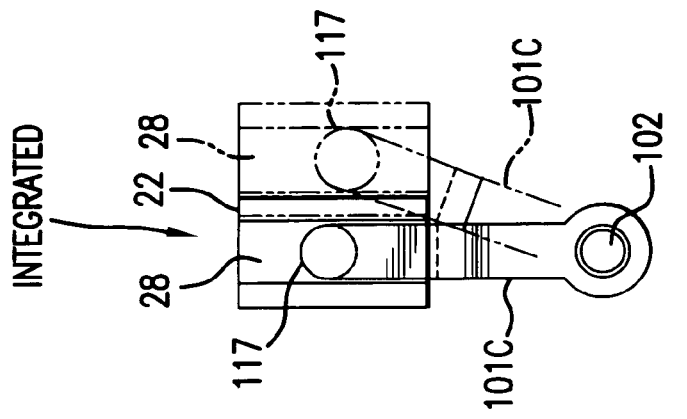
FIGS. 19(a) and 19(b) illustrate still another arm member.
Figure 19B:
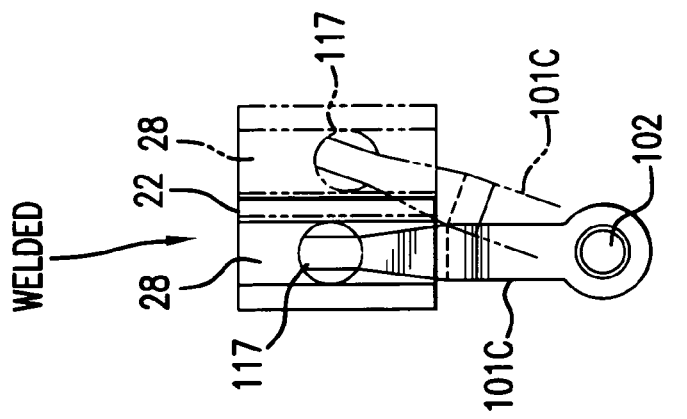
Figure 19A:
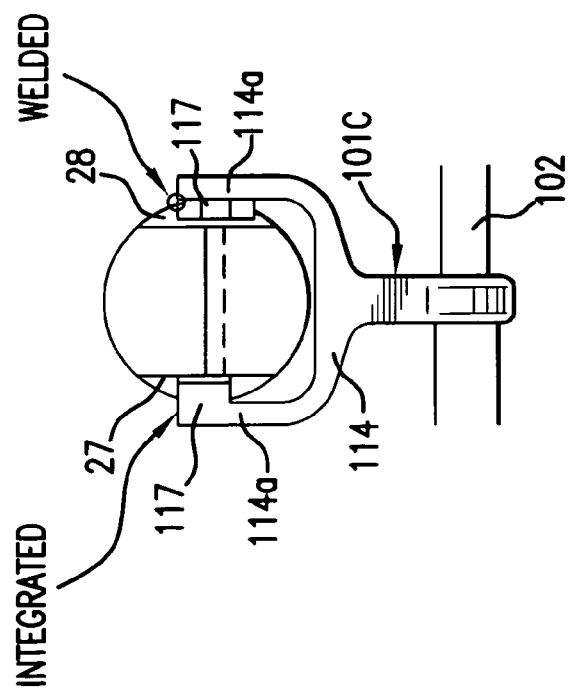

In FIGS. 19(a), 19(b) and 19(c), the cam follower 17 is also formed with a circular shape. The distal ends 114a of the bifurcated section 114 overlap with the entire length of the cam follower 117 in the vertical direction of the figure. The cam follower 117 may be configured such that the distal ends 114a of the bifurcated section 114 are welded as shown in FIG. 19(b), or may be formed integrally with the distal ends 114a of the bifurcated section 114.

Figure 20A:
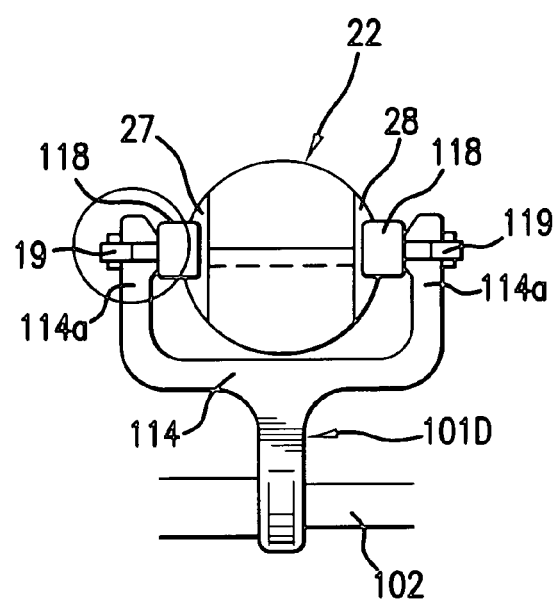
FIGS. 20(a) and 20(b) illustrate yet another arm member.
Figure 20B:
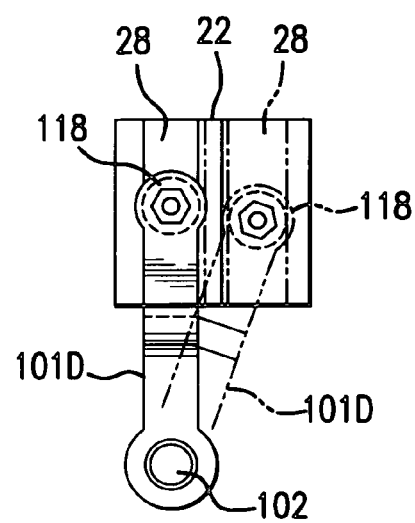

The cam follower 118 in FIGS. 20(a), 20(b) is formed as a roller-like member. This cam follower 118 is rotatably supported by a shaft 119 that is supported by the distal ends 114a of the bifurcated section 114. The cam follower 118 shown in FIGS. 20(a), 20(b) enables the arm member 101D to swing with a smooth motion along with movement of the ball nut 22.

If the configuration of an arm member 101A to 101D is symmetrical with respect to the vertical center line in the figure, as shown in each of FIGS. 17(a), 18(a), 19(a) and 20(a), the arm members 101A to 101D can be constructed by joining together two components of the same shape that are separated into left-right sections with respect to this center line. In this case, production cost can be reduced through mass production of components having the same shape.

However, with the arm members 101A to 101D shown in FIGS. 17 to 20, the arm member 6 shown in FIGS. 2, 5 and 6 and the arm member 63 shown in FIG. 7, the distance between each of the right and left distal ends 114a is large, which results in a large occupied space. In order to prevent the distal ends 114a of the bifurcated section 114 from interfering with a side wall 22a of the grooves 27 and 28 in the ball nut 22, when the respective arm members swing as shown in FIG. 17(a), a distance L2 between inside faces of the distal ends 114a is set larger than an outside diameter L1 of the ball nut 22. As a result, space efficiency is reduced.

Figure 21B:
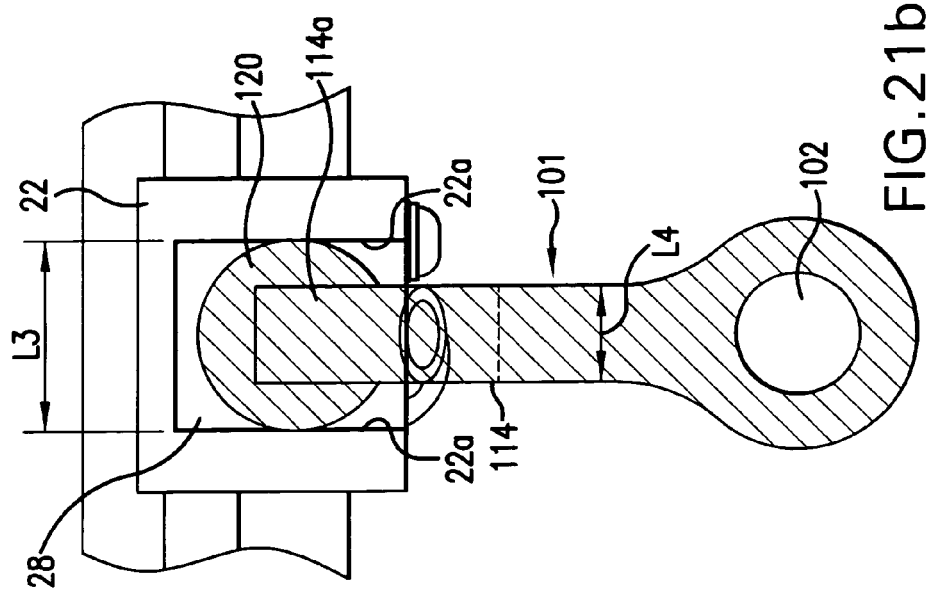
FIGS. 21(a) and 21(b) illustrate an arm member offering excellent space efficiency.
Figure 21A:
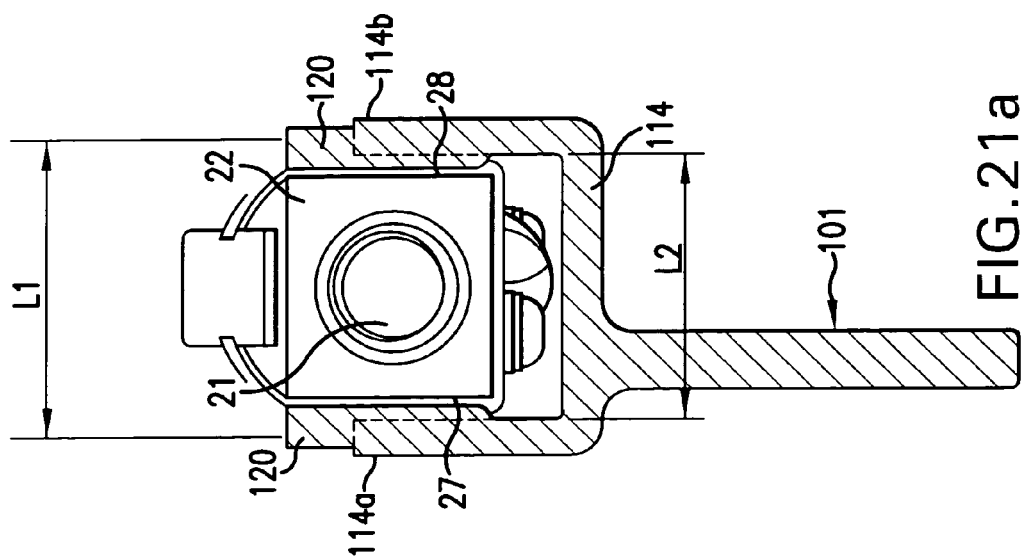

To address the problem of reduced space efficiency, the arm member 101 may be constructed with the configuration shown in FIG. 21(a), 21(b). FIG. 21(a) shows a section in a direction perpendicular to the axis of the ball nut 22. FIG. 21(b) is a view of 21(a) as seen from the right side.

In other words, as shown in FIG. 21(b), width L3 of the groove 28 (27) in the ball nut 22 is enlarged, and correspondingly the outside diameter of the circular cam follower 120 is enlarged. Further, a width L4 of the distal end 114a of the bifurcated section 114 is shortened. Consequently, for example, even if the arm member 101 is inclined to the left side or right side from the state shown in FIG. 21((b), interference between a side wall 22a of the groove 28 (27) and the distal end 114a of the bifurcated section 114 can be effectively prevented. As a result, the distance L2 between the distal ends 114a can be made smaller than the outside diameter L1 (see FIG. 17(a)) of the ball nut 22, as shown in FIG. 21(a). That is, it is possible to reduce the space occupied since it is possible to make the bifurcated section smaller.

Figure 22A:
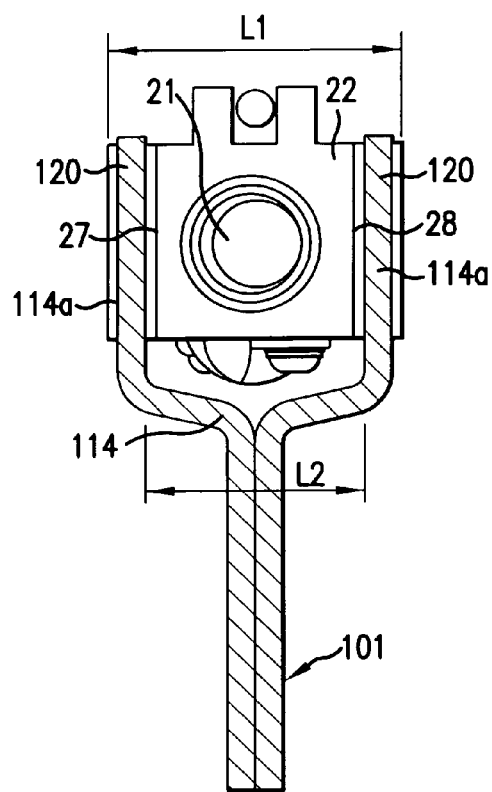
FIGS. 22(a) and 22(b) illustrate another arm member offering excellent space efficiency.
Figure 22B:
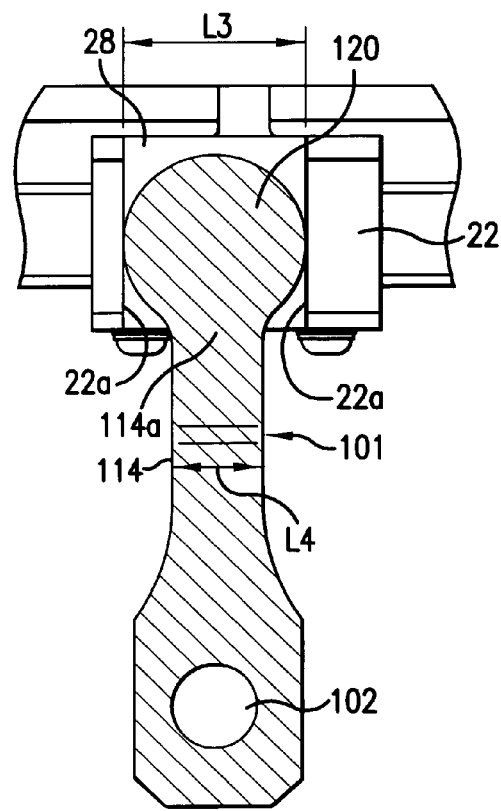

FIGS. 22(a), 22(b) show still another example of the arm member. As shown in FIGS. 22(a), 22(b), the width L3 of the groove 28 (27) in the ball nut 22 is enlarged, and, correspondingly, the outside diameter of the circular cam follower 120 is enlarged. Further, the width L4 between the distal ends 114a of the bifurcated section 114 is reduced. As a result, even if the arm member 101 is inclined to the right side or left side from the state shown in FIG. 22(b), interference between a side wall 22a of the groove 28 (27) and the distal end 114a of the bifurcated section 114 can be effectively prevented. Consequently, as shown in FIG. 22(a), the width (distance) L2 between the distal ends 114a can be made smaller than width L5 of the ball nut 22. That is, it is possible to reduce the size of the bifurcated section 114, whereby it becomes possible to reduce the occupied space. Because the configuration of the arm member 101 shown in FIGS. 22(a), 22(b) is symmetrical with respect to the center line in the vertical direction in (a), like those shown in FIGS. 17 to 20 above, the arm member 101 can be constructed by joining together two components of the same shape that are separated into left-right sections with respect to this center line. Consequently, production cost can be reduced through mass production of components having the same shape.

(4) Range Control Shaft

Figure 23:
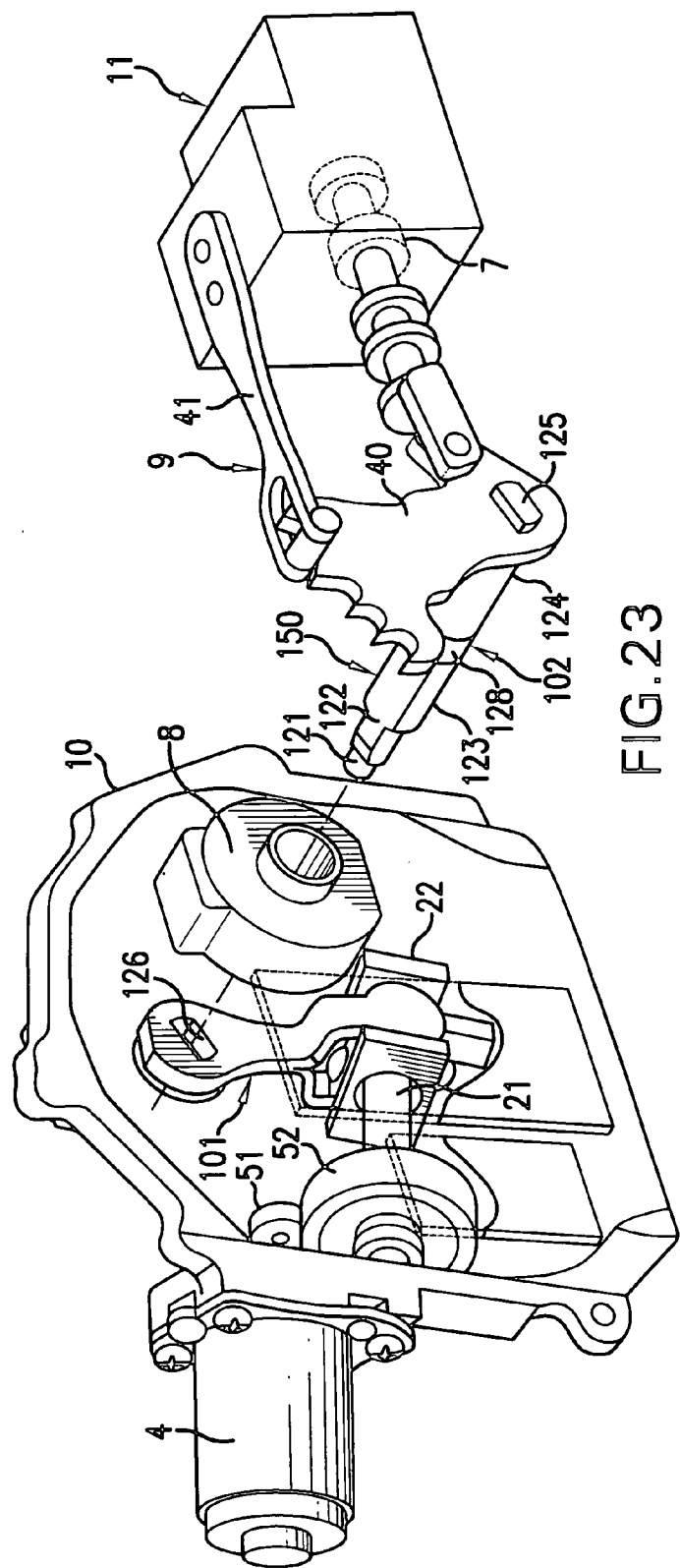
FIG. 23 is a semi-exploded perspective view of the range switching device according to the sixth embodiment.

FIGS. 11 and 23 are semi-exploded perspective views of the range switching device 100, showing the range control shaft 102 of this sixth embodiment.

As shown in these figures, the range control shaft 102 includes a distal end supporting section 121, an arm fitting section (rectangular section) 122, a sensor fitting section 123, a rear end supporting section 124 and a lever fitting section 125, in that order from the distal end side (the upper section in FIG. 11) to the proximal end side. The distal end supporting section 121 is cylindrical, and fits into a cylindrical recess 14a in the upper cover 14 of the case member 10. That is, the distal end supporting section 121 has a spigot-joint like configuration and is rotatably supported by the recess 14a. Because this spigot-joint like configuration is adopted, it is no longer necessary for the distal end of the range control shaft 102 to be tightened with a nut. As a result, when the SBW unit is mounted in the A/T case 12, attachment of the A/T case 12 can be after the SBW unit itself is assembled, thereby reducing the total number of assembly steps.

The arm fitting section 122 is formed with a square cross-section, and is received in the rectangular through hole 126 in the arm member 101. The sensor fitting section 123 has a step and passes through the center of the position sensor 8 and is received in the through hole provided in the position sensor 8. The rear end supporting section 124 is cylindrical and is rotatably supported by a needle bearing (bearing member) 127 attached to the case 12 of the automatic transmission. The lever fitting section 125 is formed with a square cross-section, and is received in the rectangular through hole 43 in the detent lever 40. Because the range control shaft 102 is supported at both ends of its length, namely, by the distal end supporting section 121 and by the rear end supporting section 124 which, in turn, are rotatably supported by the recess 14a and the needle bearing 127, the influence of angle error on the position sensor 8 can be reduced.

If only the distal end supporting section 121 of the range control shaft 102 has such a spigot-joint like configuration, when the SBW unit is installed in the A/T case 12, undesirable inclination of the range control shaft 102 is likely to result.

Thus, according to this sixth embodiment, by using the spigot-joint like configuration for the fitting configuration, namely a fitting configuration 128 in which the case 10 of the SBW unit is fit to the A/T case 12, such an inclination can be avoided. As a result, by fitting the SBW unit, after assembly into the A/T case 12, the A/T case 12 and the SBW unit are accurately connected and, at the same time, the distal end supporting section 121 of the range control shaft 102 is fitted into the recess 14a. Consequently, the range control shaft 102 is rotatably supported by the distal end supporting section 121 and the rear end supporting section 124, thereby inhibiting unwanted inclination of the range control shaft 102.

By adopting the above-described configuration in which the case member 10 is installed externally on the casing (equivalent to the A/T case 12 of the embodiment) of the power train, the range switching device can be installed on the casing as a single unit together with the case 10. Therefore, this range switching device can be easily installed on a vehicle. The term "power train" as used herein refers to: an engine as a drive unit; an automatic transmission (A/T) that automatically executes a take-off operation and speed change operations; a semi-automatic transmission in which speed change is carried out manually; a continuous variable transmission (CVT) capable of controlling a speed change ratio of a shifted gear; an internal combustion engine and an electric motor for driving a hybrid vehicle; or a motor for driving an electric vehicle.

(5) First Control Unit (SBW, CU) and Second Control Unit (A/T, ECU)

Figure 10A:
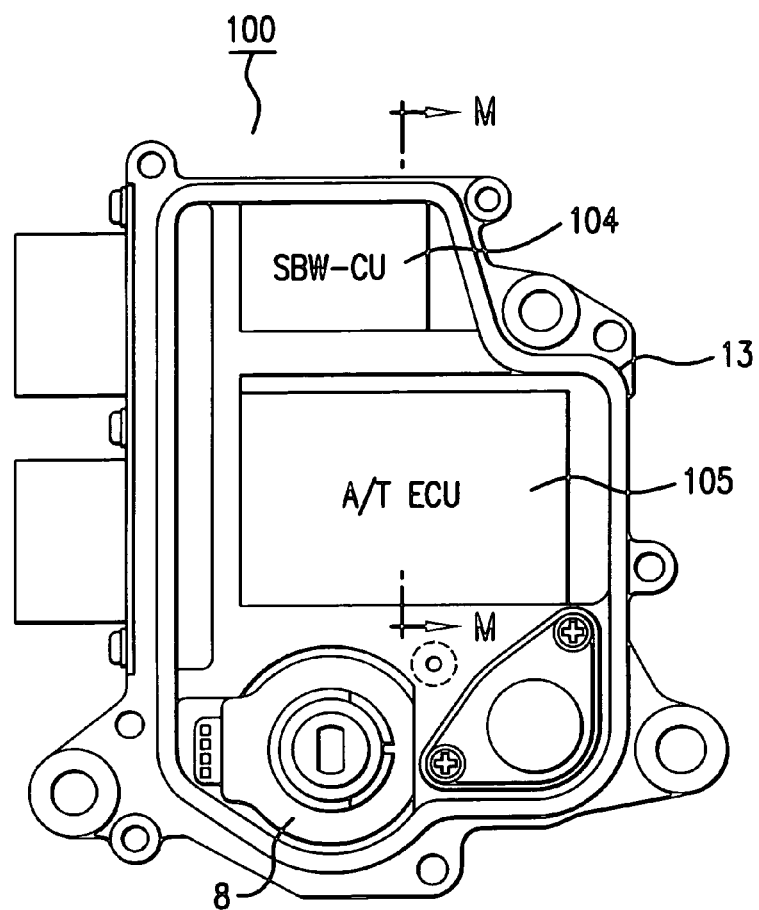
FIG. 10(a) is a plan view of the sixth embodiment with its upper cover and an intermediate cover removed.
Figure 10B:
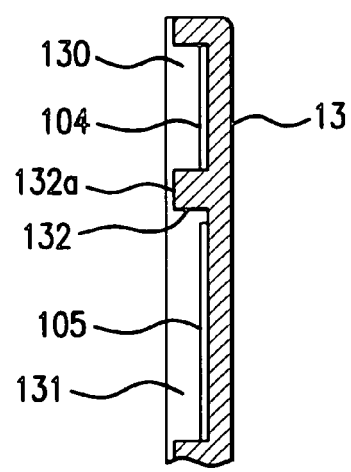
FIG. 10(b) is a view taken along line M—M in FIG. 10(a)
Figure 11:
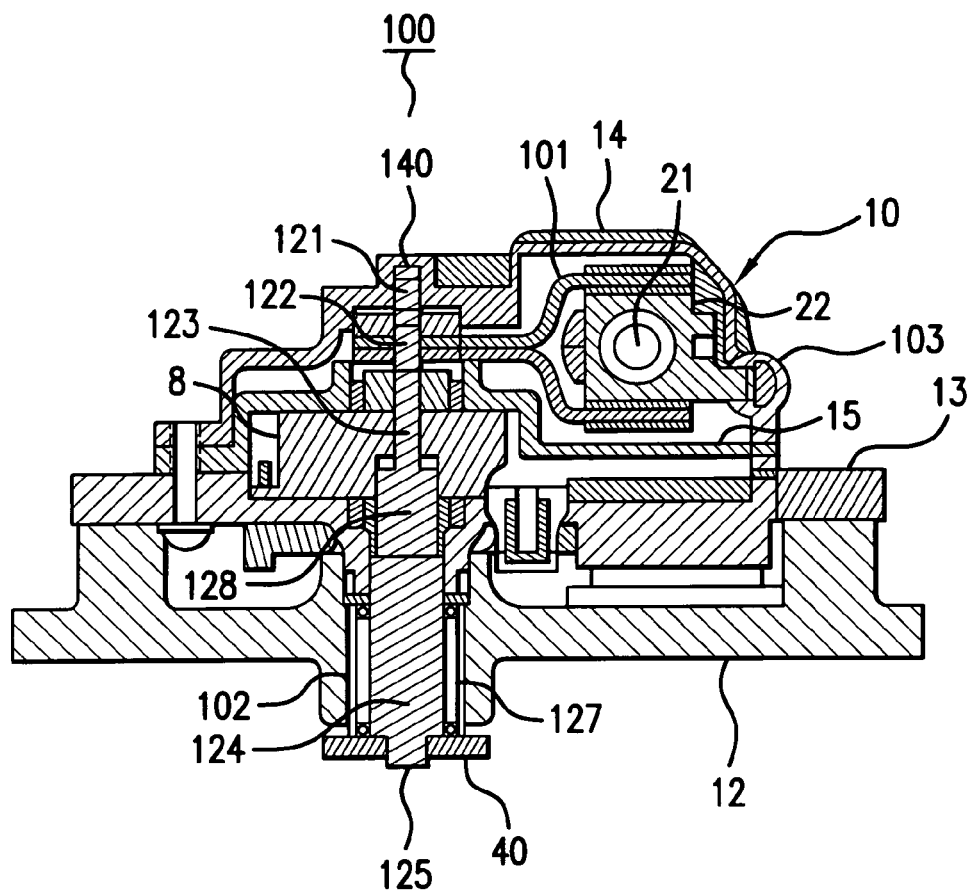
FIG. 11 is a sectional view taken along line K—K in FIG. 9.

According to this sixth embodiment, as shown in FIGS. 10(a), 10(b), the first control unit 104 for controlling the motor 4 and the second control unit 105 for controlling the automatic transmission are separate. That is, the first control unit 104 for controlling the motor 4 is provided on a support separate from the second control unit 105. Further, the first control unit 104 and the second control unit 105 are housed in independent concave housing chambers 130 and 131, which have different sizes. These housing chambers 130 and 131 are divided by a wall section 132. Thus, the second control unit 105 can use the same case, even when the final product does not employ the first control unit 104. Further, because the first control unit 104 and the second control unit 105 are housed in chambers 130 and 131 having different sizes, they can be easily positioned at the time of installation and their positioning accuracies can be improved. Moreover, in the case of bonding the first and second control units 104 and 105 with an adhesive agent, even if excessive adhesive agent is applied, there is no possibility that the adhesive agent will flow out into the other chamber, thereby impairing the control unit therein. Further, if the chambers 104 and 105 are configured such that they communicate with each other through a gap provided at the top of the wall section, the number of breathers can be reduced to one, as compared to the case where two breathers are needed due to the first and second control units 104 and 105 being accommodated in separate chambers.

Seventh Embodiment

Figure 24:
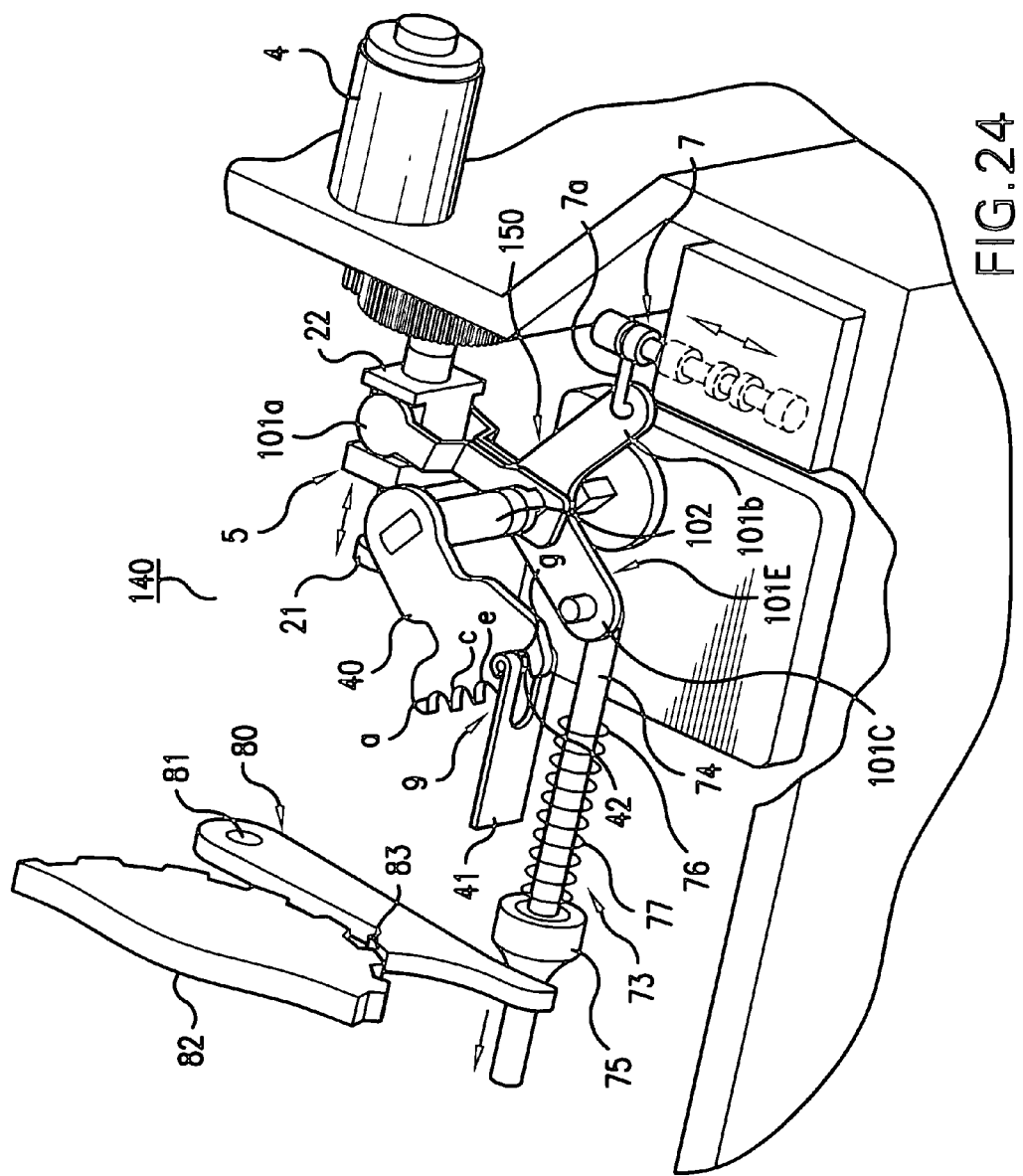
FIG. 24 is a perspective view of a range switching device according to a seventh embodiment.

FIG. 24 is a perspective view of a range switching device 140 of a seventh embodiment.

In this seventh embodiment, an intermediate member 150 is disposed between the conversion mechanism 5 and the range switching member 7. The intermediate member 150 includes the range control shaft 102 which is freely rotatable, a detent lever 40 at the top of the range control shaft 102, and an arm member 101E at the bottom of the range control shaft 102. The range control shaft 102, the detent lever 40 and the arm member 101E rotate (swing) in an integrated manner around the range control shaft 102. The detent lever 40 has a plurality of range grooves a, c, e and g. When the detent lever 40 rotates such that the roller 42, which is held at the distal end of the detent spring 41, engages within any one of these range grooves a, c, e and g, the range switching member 7 is positioned at a corresponding position via the intermediate member 150.

The arm member 101E shown in the figure has three arms 101a, 101b and 101c. These three arms 101a, 101b and 101c are disposed at positions that are circumferentially substantially 120 degrees apart. Of these arms, the arm 101a is engaged with the ball nut 22 that constitutes, along with the ball screw shaft 21, a ball screw (serving as the "conversion mechanism" 5). The arm 101b is connected to the range switching member 7 through the connecting member 7a. The arm 101c is connected to the parking rod 74 of the parking mechanism 73. Referring to the FIG. 24, the range switching member 7 is disposed at the P range (parking) and then, the parking rod 74 is moved in the direction of the arrow. Accordingly, the compression spring 77 is urged in the direction of the arrow by the flange 76 that is integrated with the parking rod 74, and the wedge 75 is urged in the direction of the arrow by this compression spring 77, so that the parking pole 80 is urged upward. As a result, if the parking gear 82 is rotated slightly, the pawl 83 of the parking pawl 80 engages the parking gear 82 so that locking takes place.

According to this seventh embodiment, the ball screw shaft 21 for moving the ball nut 22, the range switching member 7 and the parking rod 74 are disposed such that their axes are located on substantially the same plane. Consequently, when the arm member 101E swings, only a torque around the range control shaft 102 is applied, and no other, unnecessary torque is generated. Further, the ball screw shaft 21 and the parking rod 74 are disposed substantially in parallel to each other and the direction of movement of the ball nut 22 is opposite to the direction of movement of the parking rod 74. Additionally, the range switching member 7 is disposed perpendicular to the ball screw shaft 21 and the parking rod 74, so that it moves perpendicularly.

Because the three members, that is, the ball screw shaft 21, the range switching member 7 and the parking rod 74 are relatively positioned as described above and move in directions relative to the arm member 101E as described above, the range switching member 7 and the parking rod 74 can operate smoothly with a linear motion in the direction of their length, as a result of the swinging motion of the arm member 101E originating from the linear motion of the ball nut 22. Further, the direction of movement of the range switching member 7 is different from the direction of movement of the parking rod 74, so that when the range switching member 7 is moved, it is unlikely to be affected by the movement of the parking rod 74. Therefore, accuracy of movement and positioning accuracy of the range switching member 7 are improved.

As described above the parking rod 74 is disposed in parallel with the ball screw shaft 21 and the range switching member 7 is disposed at right angles thereto. However, the invention is not limited to the above description, and by interposing the arm member 101E in the above-described manner, the direction of movement of the parking rod 74 and that of the range switching member 7 may be freely chosen. In other words, it is possible to set the relative positions and the direction of these members as desired, thus improving freedom of design. It should be noted that, if necessary for reasons related to space constraint, the ball screw shaft 21, the range switching member 7 and the parking rod 74 do not need to be disposed on the same plane (coplanar).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle running range switching device for switching among a plurality of running ranges of a vehicle transmission, from one of the running ranges to a running range selected by a vehicle driver, responsive to an electric signal, said vehicle running range switching device comprising:
    a range selection unit for use by the vehicle driver to generate the electric signal;
    a motor which outputs rotary motion controlled responsive to the electric signal from the range selection unit;
    a conversion mechanism for converting rotary motion of the motor to linear motion, wherein the conversion mechanism is a ball screw including a ball screw shaft rotated by the motor, a ball nut driven by the ball screw shaft so as to move axially with respect thereto and balls interposed between the ball screw shaft and the ball nut;
    an intermediate mechanism engaged with and pivoting with linear motion of the ball nut, for converting linear motion obtained by the conversion mechanism to swinging motion;
    a range switching member, which is movable across a plurality of selection regions corresponding to the plurality of running ranges and which is switched, by the swinging motion, to a specific selection region corresponding to the running range selected by the driver; and
    a detent mechanism for holding the range switching member in the specific selection region.

2. The vehicle running range switching device according to claim 1, wherein the intermediate mechanism is disposed between the range switching member and the conversion mechanism, and the range switching member is switched to a specified selection region among the plurality of selection regions through the intermediate member in accordance with the rotary motion of the motor.

3. The vehicle running range switching device according to claim 2, wherein the intermediate mechanism includes an intermediate arm for converting the linear motion to the swinging motion.

4. The vehicle running range switching device according to claim 1, wherein the detent mechanism includes a detent lever with an integral arm, and wherein the integral arm member converts the swinging motion with which the detent lever moves to linear motion for positioning said range switching member.

5. The vehicle running range switching device according to claim 4, wherein the range switching member is a manual valve and wherein the linear motion imparted by the integral arm slides the manual valve to a position corresponding to the specific selection region.

6. The vehicle running range switching device according to claim 5, further comprising:
    a case member on which the motor is mounted,
    a position detecting unit for detecting the position of the range switching member, wherein
    the case member accommodates at least one of a first control unit for controlling the motor base on an output from the position detecting unit and a second control unit for controlling the vehicle transmission.

7. The vehicle running range switching device according to claim 6, wherein the position detecting unit detects the position of the range switching member through the intermediate mechanism.

8. The vehicle running range switching device according to claim 4, wherein the range switching member is joined to the integral arm.

9. The vehicle running range switching device according to claim 1 wherein the intermediate mechanism includes an intermediate arm engaged with the ball nut and an intermediate shaft connecting the intermediate arm with the detent mechanism.

* * * * *

UNITED STATES PATENT AND TRADEMARK OFFICE
CERTIFICATE OF CORRECTION

| | | |
|---|---|---|
| PATENT NO. | : 7,146,871 B2 | Page 1 of 1 |
| APPLICATION NO. | : 10/825595 | |
| DATED | : December 12, 2006 | |
| INVENTOR(S) | : Ozaki et al. | |

It is certified that error appears in the above-identified patent and that said Letters Patent is hereby corrected as shown below:

On the title page: Item [73] Assignee: "Aisin A W Co., Ltd" should read -- Aisin AW Co., Ltd. --.

Column 24, line 32 (claim 6, line 7) "base" should read -- based --.

Signed and Sealed this

Twelfth Day of June, 2007

JON W. DUDAS
*Director of the United States Patent and Trademark Office*